United States Patent
Ostby et al.

(10) Patent No.: US 10,817,671 B2
(45) Date of Patent: *Oct. 27, 2020

(54) SYSTEM AND METHOD FOR ANALYSIS AND NAVIGATION OF DATA

(71) Applicant: SAVANTX, INC., Jackson, WY (US)

(72) Inventors: David Linus Ostby, Las Cruces, NM (US); Edmond Audrey Heinbockel, Jackson, WY (US)

(73) Assignee: SAVANTX, Inc., Jackson, WY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/691,027

(22) Filed: Nov. 21, 2019

(65) Prior Publication Data

US 2020/0104370 A1    Apr. 2, 2020

Related U.S. Application Data

(63) Continuation of application No. 15/907,251, filed on Feb. 27, 2018, now Pat. No. 10,528,668.

(Continued)

(51) Int. Cl.
*G06F 40/30* (2020.01)
*G06T 11/20* (2006.01)
(Continued)

(52) U.S. Cl.
CPC ............ *G06F 40/30* (2020.01); *G06F 40/284* (2020.01); *G06T 11/206* (2013.01); *G06T 15/005* (2013.01); *G06T 19/00* (2013.01)

(58) Field of Classification Search
CPC .......... G06F 17/27; G06F 17/28; G06F 17/30; G06F 40/284; G06F 40/30; G06F 7/20; G06F 16/285; G06F 16/35; G06F 16/93; G06F 16/955; G06F 17/306; G06F 17/308; G06F 40/289; G06F 40/56; G06F 40/137; G06N 5/04; G06N 7/00; G06N 3/126; G06T 11/20; G06T 11/206; G06T 15/005; G06T 19/00; G06Q 10/20
(Continued)

(56) References Cited

U.S. PATENT DOCUMENTS 3,916,387 A    10/1975  Woodrum
4,839,853 A     6/1989  Deerwester
(Continued)

OTHER PUBLICATIONS

Ostby; U.S. Appl. No. 15/907,251, filed Feb. 27, 2018.
(Continued)

*Primary Examiner* — Gerald Gauthier
(74) *Attorney, Agent, or Firm* — Fitch, Even, Tabin & Flannery LLP

(57) ABSTRACT

Systems and methods for analyzing a large number of textual passages are described. A computing device receives the textual passages as input and generates a Raw Pair Distance (RPD) table. The device then determines a Node table and an Node-Node Distance (NND) matrix from the RPD table. An energy reduction process is used to generate an NSPACE matrix from the NND matrix. Finally, a 3D visualizer displays aspects of the Nodes table and the NSPACE matrix to a user. The systems and methods may enable a user to quickly search and understand the text relationships within the large number of textual passages.

20 Claims, 15 Drawing Sheets

Related U.S. Application Data

(60) Provisional application No. 62/465,058, filed on Feb. 28, 2017.

(51) Int. Cl.
  *G06T 15/00* (2011.01)
  *G06T 19/00* (2011.01)
  *G06F 40/284* (2020.01)

(58) Field of Classification Search
  USPC ..... 704/9; 707/723, 741, 740, 769; 715/230, 715/254; 706/20; 716/136
  See application file for complete search history.

(56) References Cited

U.S. PATENT DOCUMENTS

| | | | |
|---|---|---|---|
| 5,450,523 A | 9/1995 | Zhao | |
| 5,608,622 A | 3/1997 | Church | |
| 5,619,709 A | 4/1997 | Caid | |
| 5,774,888 A | 6/1998 | Light | |
| 6,269,153 B1 | 7/2001 | Carpenter | |
| 6,282,538 B1 | 8/2001 | Woods | |
| 6,493,709 B1 | 12/2002 | Aiken | |
| 6,523,026 B1* | 2/2003 | Gillis | G06F 16/3332 |
| 6,532,469 B1 | 3/2003 | Feldman | |
| 6,629,097 B1* | 9/2003 | Keith | G06F 16/9558 |
| 6,665,641 B1 | 12/2003 | Coorman | |
| 6,741,959 B1 | 5/2004 | Kaiser | |
| 6,850,937 B1 | 2/2005 | Hisamitsu | |
| 6,970,881 B1 | 11/2005 | Mohan | |
| 7,548,910 B1 | 6/2009 | Chu | |
| 7,680,647 B2 | 3/2010 | Moore | |
| 7,809,551 B2 | 10/2010 | Sandor | |
| 8,108,208 B2 | 1/2012 | Maekelae | |
| 8,650,187 B2 | 2/2014 | Chen | |
| 8,930,176 B2 | 1/2015 | Li | |
| 8,996,523 B1 | 3/2015 | Fisher | |
| 9,552,412 B1 | 1/2017 | Lowe | |
| 9,619,565 B1 | 4/2017 | Dean | |
| 9,715,495 B1 | 7/2017 | Tacchi | |
| 9,754,020 B1 | 9/2017 | Kosloski | |
| 9,779,141 B2 | 10/2017 | Jain | |
| 10,102,274 B2* | 10/2018 | Mittal | G06F 16/3344 |
| 10,198,499 B1 | 2/2019 | McNair | |
| 10,242,090 B1* | 3/2019 | Kosloski | G06F 16/35 |
| 10,360,229 B2 | 7/2019 | Ostby | |
| 10,372,718 B2 | 8/2019 | Ostby | |
| 10,528,668 B2* | 1/2020 | Ostby | G06F 40/284 |
| 2001/0037328 A1 | 11/2001 | Pustejovsky | |
| 2002/0032564 A1 | 3/2002 | Ehsani | |
| 2002/0123989 A1 | 9/2002 | Kopelman | |
| 2002/0128821 A1 | 9/2002 | Ehsani | |
| 2003/0033582 A1* | 2/2003 | Klein | G06F 16/9024 716/136 |
| 2003/0097352 A1 | 5/2003 | Gutta | |
| 2003/0097353 A1 | 5/2003 | Gutta | |
| 2003/0177000 A1 | 9/2003 | Mao | |
| 2003/0177112 A1 | 9/2003 | Gardner | |
| 2003/0187643 A1 | 10/2003 | Van Thong | |
| 2004/0003401 A1 | 1/2004 | Gutta | |
| 2004/0078190 A1 | 4/2004 | Fass | |
| 2005/0120011 A1 | 6/2005 | Dehlinger | |
| 2005/0273812 A1 | 12/2005 | Sakai | |
| 2006/0116994 A1 | 6/2006 | Jonker | |
| 2007/0112908 A1 | 5/2007 | Bi | |
| 2007/0118491 A1* | 5/2007 | Baum | G06F 16/285 706/20 |
| 2007/0294235 A1 | 12/2007 | Millett | |
| 2008/0071763 A1 | 3/2008 | Ferrenq | |
| 2008/0125161 A1 | 5/2008 | Ergen | |
| 2008/0235209 A1 | 9/2008 | Rathod | |
| 2008/0294680 A1 | 11/2008 | Powell | |
| 2008/0306726 A1 | 12/2008 | Levy | |
| 2009/0226872 A1 | 9/2009 | Gunther | |
| 2009/0319518 A1 | 12/2009 | Koudas | |
| 2009/0327279 A1 | 12/2009 | Adachi | |
| 2010/0031240 A1 | 2/2010 | Drumm | |
| 2010/0114890 A1 | 5/2010 | Hagar | |
| 2010/0138428 A1 | 6/2010 | Uchino | |
| 2010/0150453 A1 | 6/2010 | Ravid | |
| 2010/0257159 A1* | 10/2010 | Uematsu | G06F 16/334 707/723 |
| 2010/0324883 A1 | 12/2010 | Platt | |
| 2011/0004610 A1 | 1/2011 | Rose | |
| 2011/0008020 A1 | 1/2011 | Inoue | |
| 2011/0131595 A1 | 6/2011 | Xue | |
| 2011/0184723 A1 | 7/2011 | Huang | |
| 2011/0191310 A1 | 8/2011 | Liao | |
| 2011/0214080 A1 | 9/2011 | Agrawal | |
| 2011/0219003 A1 | 9/2011 | Bi | |
| 2011/0314006 A1 | 12/2011 | Sweeney | |
| 2012/0209853 A1 | 8/2012 | Desai | |
| 2012/0215806 A1* | 8/2012 | Pryakhin | G06F 16/322 707/769 |
| 2012/0253793 A1 | 10/2012 | Ghannam | |
| 2012/0278341 A1 | 11/2012 | Ogilvy | |
| 2012/0303626 A1* | 11/2012 | Friedmann | G06F 16/00 707/740 |
| 2012/0330968 A1 | 12/2012 | Lee | |
| 2013/0138428 A1 | 5/2013 | Chandramouli | |
| 2013/0159348 A1 | 6/2013 | Mills | |
| 2013/0262361 A1 | 10/2013 | Arroyo | |
| 2014/0040275 A1* | 2/2014 | Dang | G06F 16/2228 707/741 |
| 2014/0058723 A1* | 2/2014 | Shen | G06F 40/247 704/9 |
| 2014/0067391 A1 | 3/2014 | Ganapathiraju | |
| 2014/0108006 A1 | 4/2014 | Vogel | |
| 2014/0114897 A1 | 4/2014 | Nakamura | |
| 2014/0163953 A1 | 6/2014 | Parikh | |
| 2014/0214419 A1 | 7/2014 | Rao | |
| 2014/0258301 A1 | 9/2014 | Misra | |
| 2014/0277752 A1 | 9/2014 | Chang | |
| 2014/0280113 A1 | 9/2014 | Hohwald | |
| 2015/0135053 A1* | 5/2015 | Doornenbal | G06F 40/30 715/230 |
| 2015/0213096 A1 | 7/2015 | Montgomery | |
| 2015/0227579 A1 | 8/2015 | Cantarero | |
| 2015/0302084 A1 | 10/2015 | Stewart | |
| 2015/0339369 A1 | 11/2015 | Rais-Ghasem | |
| 2016/0012115 A1 | 1/2016 | Vata | |
| 2016/0055134 A1* | 2/2016 | Sathish | G06F 16/345 715/254 |
| 2016/0103917 A1 | 4/2016 | Talmor | |
| 2016/0124947 A1 | 5/2016 | Heinbockel | |
| 2016/0125038 A1 | 5/2016 | Heinbockel | |
| 2016/0162466 A1 | 6/2016 | Munro | |
| 2016/0321241 A1* | 11/2016 | Mitsuishi | G06N 7/005 |
| 2017/0011029 A1 | 1/2017 | Chatterjee | |
| 2017/0024186 A1* | 1/2017 | Fazl Ersi | G06K 9/6222 |
| 2017/0024466 A1* | 1/2017 | Bordawekar | G06F 40/216 |
| 2017/0068655 A1 | 3/2017 | Wang | |
| 2017/0068738 A1* | 3/2017 | Ikeda | G06Q 30/0631 |
| 2017/0087416 A1 | 3/2017 | Hu | |
| 2017/0091198 A1 | 3/2017 | Zhang | |
| 2017/0115131 A1 | 4/2017 | Huang | |
| 2017/0156203 A1 | 6/2017 | Shiue | |
| 2017/0243399 A1* | 8/2017 | Troy | G06T 19/003 |
| 2017/0323219 A1* | 11/2017 | Shahrzad | G06N 3/126 |
| 2017/0371865 A1* | 12/2017 | Eck | G06F 40/42 |
| 2018/0005414 A1 | 1/2018 | Lee | |
| 2018/0018317 A1 | 1/2018 | Cheng | |
| 2018/0032517 A1* | 2/2018 | English | G06F 16/93 |
| 2018/0054216 A1 | 2/2018 | Sengoku | |
| 2018/0082197 A1* | 3/2018 | Aravamudan | G06F 40/30 |
| 2018/0121539 A1 | 5/2018 | Ciulla | |
| 2018/0173693 A1 | 6/2018 | Vaknin | |
| 2018/0196798 A1 | 7/2018 | Yadati | |
| 2018/0219897 A1 | 8/2018 | Muddu | |
| 2018/0241713 A1 | 8/2018 | Subba | |
| 2018/0246879 A1* | 8/2018 | Ostby | G06F 40/284 |
| 2018/0260475 A1 | 9/2018 | Zhang | |
| 2018/0314687 A1 | 11/2018 | Nishimoto | |

(56) References Cited

U.S. PATENT DOCUMENTS

| | | | |
|---|---|---|---|
| 2018/0330248 A1 | 11/2018 | Burhanuddin | |
| 2019/0266166 A1 | 8/2019 | Venkataraman | |
| 2019/0324959 A1 | 10/2019 | Ostby | |
| 2020/0104370 A1* | 4/2020 | Ostby | G06T 11/206 |

OTHER PUBLICATIONS

Ostby; U.S. Appl. No. 16/457,160, filed Jun. 28, 2019.
Ostby; U.S. Appl. No. 14/931,709, filed Nov. 3, 2015.
Otsby; U.S. Appl. No. 14/931,697, filed Nov. 3, 2015.
PCT; International Search Report and Written Opinion of the International Searching Authority for PCT/US2018/020055 dated Jun. 7, 2018.
USPTO; Advisory Action issued in U.S. Appl. No. 14/931,709 dated Jan. 30, 2019.
USPTO; Advisory Action issued in U.S. Appl. No. 14/931,709 dated Jun. 11, 2018.
USPTO; Examiner Interview Summary issued in U.S. Appl. No. 14/931,697 dated Jan. 18, 2019.
USPTO; Final Office Action issued in U.S. Appl. No. 14/931,697 dated Sep. 7, 2018.
USPTO; Final Office Action issued in U.S. Appl. No. 14/931,709 dated Mar. 27, 2018.
USPTO; Final Office Action issued in U.S. Appl. No. 15/907,251 dated Jun. 21, 2019.
USPTO; Non-Final Office Action issued in U.S. Appl. No. 14/931,697 dated Mar. 14, 2018.
USPTO; Non-Final Office Action issued in U.S. Appl. No. 14/931,709 dated Aug. 3, 2018.
USPTO; Non-Final Office Action issued in U.S. Appl. No. 14/931,709 dated Nov. 14, 2017.
USPTO; Non-Final Office Action issued in U.S. Appl. No. 15/907,251 dated Jan. 29, 2019.
USPTO; Notice of Allowance issued in U.S. Appl. No. 14/931,697 dated Jan. 18, 2019.
USPTO; Notice of Allowance issued in U.S. Appl. No. 14/931,697 dated Mar. 12, 2019.
USPTO; Notice of Allowance issued in U.S. Appl. No. 14/931,709 dated Apr. 1, 2019.
USPTO; Notice of Allowance issued in U.S. Appl. No. 15/907,251 dated Sep. 3, 2019.
USPTO: Final Office Action issued in U.S. Appl. No. 14/931,709 dated Nov. 2, 2018.
Ostby; U.S. Appl. No. 16/926,353, filed Jul. 10, 2020.

* cited by examiner

SYSTEM AND METHOD FOR ANALYSIS AND NAVIGATION OF DATA

This application is a continuation of U.S. application Ser. No. 15/907,251, filed Feb. 27, 2018, for SYSTEM AND METHOD FOR ANALYSIS AND NAVIGATION OF DATA, which claims the benefit of U.S. Provisional Application No. 62/465,058, filed Feb. 28, 2017, for SYSTEM AND METHOD FOR ANALYSIS AND NAVIGATION OF DATA, both of which are incorporated in their entirety herein by reference.

BACKGROUND OF THE INVENTION

1. Field of the Invention

The present invention relates generally to data analysis, and more specifically to text analysis and visualization for enterprise text search.

2. Discussion of the Related Art

Various systems and processes are known in the art for data analysis and visualization for enterprise search. Computer systems track and store a large amount of data in databases and other digital formats. Thus, searching through and finding items within massive quantities of stored data has become essential for data-driven systems and businesses.

However, in many cases methods of searching through a database may be slow or may result in output that is difficult for a user to understand. This may result in reduced value for the data being stored, and a loss of efficiency when an entity is unable to effectively utilize its stored data.

SUMMARY

Several embodiments of the invention advantageously address the needs above as well as other needs by providing a data analysis system, comprising: a central processing unit (CPU); a Raw Pair Distance (RPD) module operatively coupled to the CPU and configured to receive a corpus of text and output a raw pair distance table listing each occurrence in the corpus of two different terms separated by no more than a predetermined number of other terms, wherein each row of the raw pair distance table includes the two different terms and the number of other terms separating the two different terms; a Mean Pair Distance (MPD) module operatively coupled to the CPU and configured to receive the raw pair distance table, select a plurality of nodes from the terms included in the raw pair distance table; output a nodes table wherein each row of the nodes table includes one node, a corresponding unique numerical node id number, and a corresponding mass value of the node, and output a node-node distance matrix using the raw pair distance table wherein each row of the node-node distance table includes a pair of terms from the raw pair distance table wherein each of the terms is a node, a calculated distance value of the pair of terms, and a calculated strength of the pair of terms; an Energy Reduction module operatively coupled to the CPU and configured to receive the node-node distance matrix and output an NSPACE matrix for a predetermined number of dimensions n, wherein each row includes one node numerical id and coordinates specifying a location of the corresponding node in n-dimensions; and a 3D visualizer operatively coupled to the CPU and configured to receiving the NSPACE matrix and communicate with a display to provide a graphical representation of selected nodes and coordinate relationships between the selected nodes.

In another embodiment, the invention can be characterized as a method for analyzing a plurality of text passages from a corpus of text using a text analysis system including at least one computing device including a processor, non-transitory memory, and at least one application configured to run on the processor, wherein the corpus is searchable and accessible by the system, comprising the steps of:compiling a list of all terms included in the plurality of text passages; determining all co-located term pairs in the plurality of text passages, wherein each co-located term pair comprises one occurrence of two different terms separated by no more than a first predetermined number of other terms; creating a raw pair distance table including each co-located term pair and the number of other terms separating each co-located term pair; selecting a plurality of nodes from the plurality of terms, wherein the nodes are selected by an importance algorithm; calculating a mass value for each node; creating a nodes table including each node and the corresponding mass for each node; creating a node-node-distance table including each co-located term pair of the raw pair distance table where the co-located term pair includes two nodes, a calculated distance value of the co-located term pair, and a calculated strength value of each pair; running an energy reduction algorithm on the node-node distance table using a predetermined number of dimensions n, whereby a point in n-dimensional space is calculated for each node; and creating an NSPACE matrix including n-dimensional coordinates for each node.

In yet another embodiment, the invention can be characterized as a method for creating an optimized node coordinate matrix in a predetermined number of dimensions n from a node-node distance matrix, wherein the node-node distance matrix includes a plurality node pairs and a distance associated with each node pair, using a text analysis system comprising a CPU and at least one software module operatively coupled to the CPU and configured to perform the text analysis method, comprising the steps of: assigning a coordinate location in n-space to each node; setting a stress value; creating an offset array based on the number of dimensions; for each node, performing the steps of: for each row of the offset array, setting the row equal to a current offset array row and performing the steps of: offsetting the coordinate location of the node based on the current offset array row; determining, based on the offset coordinate location for each node pair including the selected node, a trial distance between the nodes in the node pair based on the offset coordinate location of the node and the coordinate location of the other node; comparing the trial distance for each node pair with the corresponding node pair distance from the node-node distance matrix; assigning a stress value to each node pair wherein the larger the difference between the compared distances, the larger the stress value; summing the node pair stresses; and setting, if the sum of the node pair stresses is lower than the stress value, the stress value equal to the sum of the node pair stresses and setting the node coordinate location equal to the offset coordinate location, thereby determining an optimized coordinate location for each node.

DETAILED DESCRIPTION

Figure 1:
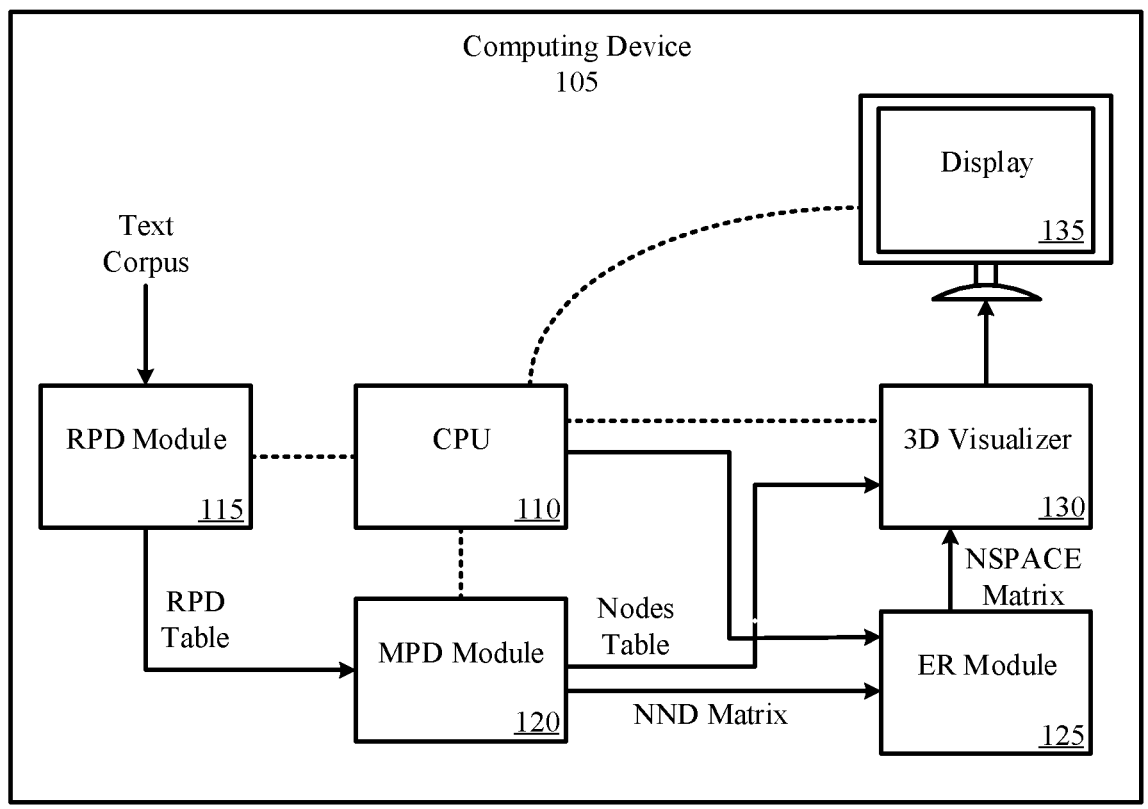
FIGS. 1 and 2 illustrate examples of a text analysis system that supports data analysis and visualization for enterprise search in accordance with aspects of the present disclosure.

Enterprise searching as generally known in the art is the practice of identifying and enabling specific content (files) across multiple enterprise-type sources such as databases, intranets, document stores, etc. to be indexed, searched and displayed to authorized users.

A large bureaucratic organization, for example a power plant, may have an Internet presence of a few hundred web pages at most, but have hundreds of millions of pages of information stored behind its firewall. This is a ratio of a million to one, or 6 orders of magnitude. For example, the GOGGLE® search engine indexes less than 1% of the Internet, and this does not include the massive data stored by private enterprise, so by some estimates search engines like GOGGLE® are indexing far less than $1/100,000,000$ of all existing data.

A large bureaucratic organization may have on the order of hundreds of millions of pages of data. In some examples, over 80% of the data is unstructured text. In some examples the text is stored mostly in the form of scanned documents, reports and text fields within databases. The aggregation of all of the bureaucratic organization's data can be referred to as the "corpus".

A problem commonly known in the art is being able to retrieve useful information from these massive stores of data. Even when this data is indexed and made searchable, another challenge quickly emerges, namely, how to deal with the large number of search engine returns. For example, a phrase search could return hundreds of thousands of returns.

Enterprise search engines as currently known in the art can provide filtering features like date ranges, acceptable file types, etc. However, these methods are inconsistent in helping to narrow results. For example, the date range may be unknown, or too wide to be helpful.

The user may employ another known strategy and use search string refinement to narrow the return set. However, even after some specific refinement, the return sets can still be very large. And of course, the user is given no guidance as to which terms should the user add to the search request, and what will be the consequences of doing so, in terms of quality of returns and quantity reduction.

With a large corpus, return sets often comprise a sub-corpus of text which is equivalent to reading many books. Users may not have the time to read through all those returns, as searching is just one of the many tasks they perform each day. Also, as the corpus grows, so too will the number of returns for the same search.

Thus, the present disclosure describes novel systems and methods for allowing the user to understand hundreds or thousands of returns in an instant, help the user choose refinement terms, provide insight into the consequences of adding them, and provide information on patterns and relationships between the terms in the return set.

Under the idiom, 'a picture is worth a thousand words', the present disclosure uses a branch of mathematics called Graph Theory. An important aspect of Graph Theory is the research and development of drawing algorithms. A drawing algorithm can take a table of data and produce a visual picture of the data called a 'graph'.

For instance, a table of data giving the seating arrangement preferences for each member of a dinner party is just the type of data that graph theory is designed to help visualize. The table is called a network table, and essentially is a listing of relationships between 'nodes'. In the case of seating preferences, the network table would indicate, say, that Bob wants to sit by Sally, but not George.

The data in a seating arrangement table can be considered specifications for a graph model, and can be drawn in different dimensions and in differing configurations.

For instance, a 2D graph of the seating data has one more degree of freedom over a 1D 'list' of the data and can thereby describe more complex network criteria. A 2D graph will depict the seating arrangement data in a way that is quickly comprehended by visual inspection, immediately allowing insights by the viewer.

As network data becomes more complex, it may not be possible to draw a graph that is a perfect reflection of the network data. Due to the incomprehensibility of data displayed in a (even a small) network table, an important aspect of Graph Theory is the research and development of drawing algorithms. A drawing algorithm takes a network table and produces a graph using various combinations of drawing methods. There are many possible drawing algorithms which could be applied to a network.

However, Graph Theory drawing algorithms lack critical features that may be used to best answer the user's 'data-overload' challenge.

For example, many network drawing algorithms do not handle edge weights. The present disclosure describes a method that preserves this feature: word pairs that have a small distance should appear close to each other in the drawing.

The usefulness of a drawing of a graph depends on its readability, that is, the capability of conveying the meaning of the network data quickly and clearly. Readability issues are expressed by means of aesthetics, which can be formulated as optimization goals for the drawing algorithm. Generally, readability and usefulness will greatly increase when going from 1D to 2D, and again going from 2D to 3D. At 3D we reach a human limit: the human brain has a difficult time comprehending a graph above 3 dimensions.

In one type of text analysis known in the art, Latent Semantic Analysis(LSA), terms may be said to be "co-located" if they occur together within a given co-location window. The window can be a sentence, paragraph, section, passage or any other method of partitioning text into smaller pieces.

Terms need not be words from any particular language. Terms are language agnostic, and therefore requires no "training" in a specified language to work. Any sequence of letters, numbers and other characters, separated by whitespace, is a "term". A term can be construed as being defined by their context. And the context for a term is given by all the relationships that are formed via co-location with other terms.

For instance, the terms "power", "plant" and "energy" form a tighter relationship in the corpus for a power plant than they would in, say, a biology text (where "plant" and "energy" may have a relationship, but not "power"). These relationships will shift with the nature of the corpus. The nature of the relationships will also change with the composition of the sub-corpus formed by a search return set.

In practice, a listing of all unique terms in a corpus may become very long, often reaching ten to hundreds of thousands of rows. The number of columns, one for each document, used for indicating in which document each term occurs can also become very large, often exceeding one million.

In some cases, a LSA sparse array including all co-locational term relationships can be fed into a mathematical function called a Singular Value Decomposition (SVD), allowing language scientists to extract not only term relationships, but also concepts, from the text. However, this may require a team of scientists and, furthermore, the decomposition of a large LSA array can occupy a super-computer for days.

While a lot of resources are spent analyzing LSA arrays, a user still may not be able to quickly understand the patterns and relationships found in a large search return set. A solution to this problem would allow a corpus of text to be turned into a network table, and once formed, used to draw a user-friendly and readable graph.

Thus, the present disclosure enables an enterprise user to understand hundreds or thousands of returns in an instant, help the user choose refinement terms, provide insight into the consequences of adding them, and provide information on patterns and relationships between the terms in the return set.

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

FIG. 1 illustrates an example of a text analysis system including a computing device 105 that supports data analysis and visualization for enterprise search in accordance with aspects of the present disclosure.

In one embodiment, the computing device 105 includes a CPU 110 and software configured to run on the CPU 110. The computing device 105 may include one or more types of user interface. In some embodiments, a plurality of computing devices 105 may be used to perform the analysis. The CPU 110 may be coupled to a plurality of dedicated modules. The modules may include a Raw Pair Distance (RPD) module 115, a Mean Pair Distance (MPD) module 120, an Energy Reduction (ER) module 125, and a 3D Visualizer 130. The system also includes the Display 135 that receives the graphical information from the 3D Visualizer 130 and displays 135 it from the user. The Display 135 may be operatively coupled to the CPU 110 or may be independent of the CPU 110.

The RPD Module 115 receives the input of the corpus text. The RPD Module 115 outputs the resulting RPD table to the MPD Module 120. The MPD Module 120 then uses the RPD Table to produce the Nodes Table and the Node-Node Distance (NND) matrix. The NND Matrix is output to the ER module 125, which outputs the resulting NSPACE matrix to the 3D Visualizer 130. The MPD module 120 also produces the Nodes Table (which maps each node ID number to its corresponding term). The 3D Visualizer 130 uses the NSPACE matrix to provide a graphical representation of the relationships between nodes, and the Nodes Table to replace the node numbers with the corresponding terms. The 3D visualizer 130 communicates with the display 135 to provide the graphical interface for the user.

Thus, in some examples, computing device 105 may include central processing unit (CPU) 110, RPD module 115, MPD module 120, ER module 125, 3D visualizer 130, and display 135.

RPD module 115 may be an example of, or incorporate aspects of, RPD module 210 as described with reference to FIG. 2. RPD module 115 may receive a corpus of text; and output a raw pair distance table listing each occurrence in the corpus of two different terms separated by no more than a predetermined number of other terms, wherein each row of the raw pair distance table includes the two different terms and the number of other terms separating the two different terms.

RPD module 115 may compile a list of all terms included in the plurality of text passages; and determine all co-located term pairs in the plurality of text passages, wherein each co-located term pair comprises one occurrence of two different terms separated by no more than a predetermined number of other terms. In some cases, RPD module 115 may create a raw pair distance table including each co-located term pair and the number of other terms separating each co-located term pair.

RPD module 115 may convert each text passage into a sequential list of terms separated by whitespace; partition each text passage into a plurality of sublists of adjacent terms, each sublist including the predetermined number of terms; and determine at least one co-located term pair and a number of terms separating each co-located term pair, from each sublist, wherein the terms in each co-located term pair are different terms.

RPD module 115 may convert the corpus to a sequential list of terms; determine, for every term string within the sequential term list with a length equal to a predetermined window length value, every pair of terms within the portion, each pair having a first term and a second term different from the first term; determine, for each pair of terms within each portion, a number of terms between the first term and the second term; store, in a raw pair distance table, each incidence of each pair of terms within the sequential list of terms, wherein each row includes a first term of one pair, a second term of the pair and the number of terms between the first term and the second term of the pair; convert the corpus to lowercase prior to converting the corpus to a sequential list of terms; and delete any rows in the raw pair distance table wherein the first term is equal to the second term.

MPD module 120 may be an example of, or incorporate aspects of, MPD module 220 as described with reference to FIG. 2. MPD module 120 may receive the raw pair distance table; select a plurality of nodes from the terms included in the raw pair distance table; output a nodes table wherein each row of the nodes table includes one node, a corresponding unique numerical node id number, and a corresponding mass value of the node (as described further below); and output a node-node distance matrix using the raw pair distance table wherein each row of the node-node distance table includes a pair of terms from the raw pair distance table wherein each of the terms is a node, a calculated distance value of the pair of terms (as described further below), and a calculated strength of the pair of terms (as described further below);

MPD module 120 may select a plurality of nodes from the plurality of terms, wherein the nodes are selected by an importance algorithm; calculate a mass value for each node; create a nodes table including each node and the corresponding mass for each node; and create a node-node-distance table including each co-located term pair of the raw pair distance table where the co-located term pair includes two nodes, a calculated distance value of the co-located term pair, and a calculated strength value of each pair.

MPD module 120 may delete each row in the raw pair distance table not including at least one node; assign a numerical value to each node (also referred to as the node ID); and calculate a mass (also referred to as the mass value) for each node pair equal to the importance of the node pair divided by the distance value (also referred to as distance) of the node pair.

MPD module 120 may receive a raw pair distance table determined from the corpus, wherein the raw pair distance table includes all instances of term pairs comprising a first term and a second term different from the first term and separated from the first term by no more than a predetermined number of terms, wherein each row in the raw pair distance table corresponds to one term pair instance and includes the first term in the term pair instance, the second term in the term pair instance and the number of terms separating the first term from the second term; select a set of important terms from a list of all unique terms in the raw pair distance table; assign a unique node identification integer to each important term; calculate a mass value for each important term based on a frequency of occurrence for the important term in the corpus; store, in a nodes table, each node term, the corresponding node identification integer, and the corresponding mass value; select, from the raw pair distance table, a subset comprising every term pair instance wherein the first term and the second term are both important terms; calculate, for each unique term pair in the subset, an average distance value; calculate, for each unique term pair in the subset, a strength value by dividing a sum of the mass values of the terms in the term pair by the average distance value; and store, in a node-node-distance table, each unique term pair, wherein each term in the pair is represented by the unique node identification integer of the term, the average distance value, and the strength value.

In some cases, the importance algorithm excludes terms included in a predetermined list of common terms. In some cases, the importance algorithm including calculating an observed-vs-expected ratio for each unique term in the plurality of text passages by dividing a frequency of the unique term in the plurality of text passages by a predetermined expected average frequency of the term. In some cases, the predetermined expected average frequency is based on a calculated average frequency of the term in the entire corpus. In some cases, the importance algorithm includes selecting fewer than 200 terms. In some cases, the selecting the plurality of nodes comprises excluding a predetermined set of common terms. In some cases, the set of important terms is less than 200. In some cases, the selecting of the set of important terms comprises excluding a predetermined set of common terms. In some cases, the selecting of the set of important terms includes comparing a previously determined predicted frequency of each term to an actual frequency of that term in the corpus.

Energy Reduction (ER) module 125 may be an example of, or incorporate aspects of, ER module 240 as described with reference to FIG. 2. ER module 125 may receive the node-node distance matrix; and output an NSPACE matrix for a predetermined number of dimensions n, wherein each row includes one node numerical id and coordinates specifying a location of the corresponding node in n-dimensions.

ER module 125 may run an energy reduction algorithm on the node-node distance table using a predetermined number of dimensions n, whereby a point in n-dimensional space is calculated for each node; and create an NSPACE matrix including n-dimensional coordinates for each node.

ER module 125 may assign a random location in n-space for each node, where n is a number of dimensions; create an offset array based on n; use the offset array to offset the location of each node; determine a distance between the node and each other node the node is paired with based on the offset location; compare the distance for each node pair with the distance for the node pair in the node-node distance matrix; assign a stress to each node pair wherein the larger the distance difference, the greater the stress; sum the stresses for the node pairs; and set, when the stress is less than a previous stress, the node location as the offset location.

ER module 125 may assign a coordinate location in n-space to each node; set a stress value; create an offset array based on the number of dimensions; set each row of the offset array equal to a current offset array row; offset the coordinate location of the node based on the current offset array row; determine, based on the offset coordinate location for each node pair including the selected node, a trial distance between the nodes in the node pair based on the offset coordinate location of the node and the coordinate location of the other node; compare the trial distance for each node pair with the corresponding node pair distance from the node-node distance matrix; assign a stress value to each node pair wherein the larger the difference between the compared distances, the larger the stress value; sum the node pair stresses; and set, if the sum of the node pair stresses is lower than the stress value, set the stress value equal to the sum of the node pair stresses and setting the node coordinate location equal to the offset coordinate location, thereby determining an optimized coordinate location for each node.

ER module 125 may perform, after creating the optimized node coordinate matrix, at least one additional pass wherein each pass including repeating the steps for each node using node coordinates from the optimized node coordinate matrix.

In some cases, the offset array is comprised of n-cubed number of rows, wherein each row has a length equal to the number of dimensions. In some cases, each offset array row is unique and each number in the array is selected from the group of −1, 0 and 1. In some cases, the offsetting the coordinate location of the node based on the current offset array row further includes multiplying each value of the current offset array by a delta value and adding each value of the current offset array row to the corresponding coordinate location of the node. In some cases, the delta value is based on the mean of the node pair distances of the node-node matrix. In some cases, the delta value is decreased after each pass.

3D visualizer 130 may be an example of, or incorporate aspects of, 3D visualizer 255 as described with reference to FIG. 2. 3D visualizer 130 may receive the NSPACE matrix; communicate with a display 135 to provide a graphical representation of selected nodes and coordinate relationships between the selected nodes; and graphically display 135 a representation of the NSPACE matrix on a display 135 coupled to the computing device 105.

In some cases, the text analysis system comprises a display 135 coupled to the 3D visualizer 130. In some cases, the display 135 is operatively coupled to the CPU 110. In some cases, the representation is a three-dimensional representation displayed on a two-dimensional display 135. In some cases, the representation includes a graphical representation of the mass value for each node displayed.

Exemplary displays produced by the 3D visualizer 130 are shown below in FIGS. 8-10.

Figure 2:
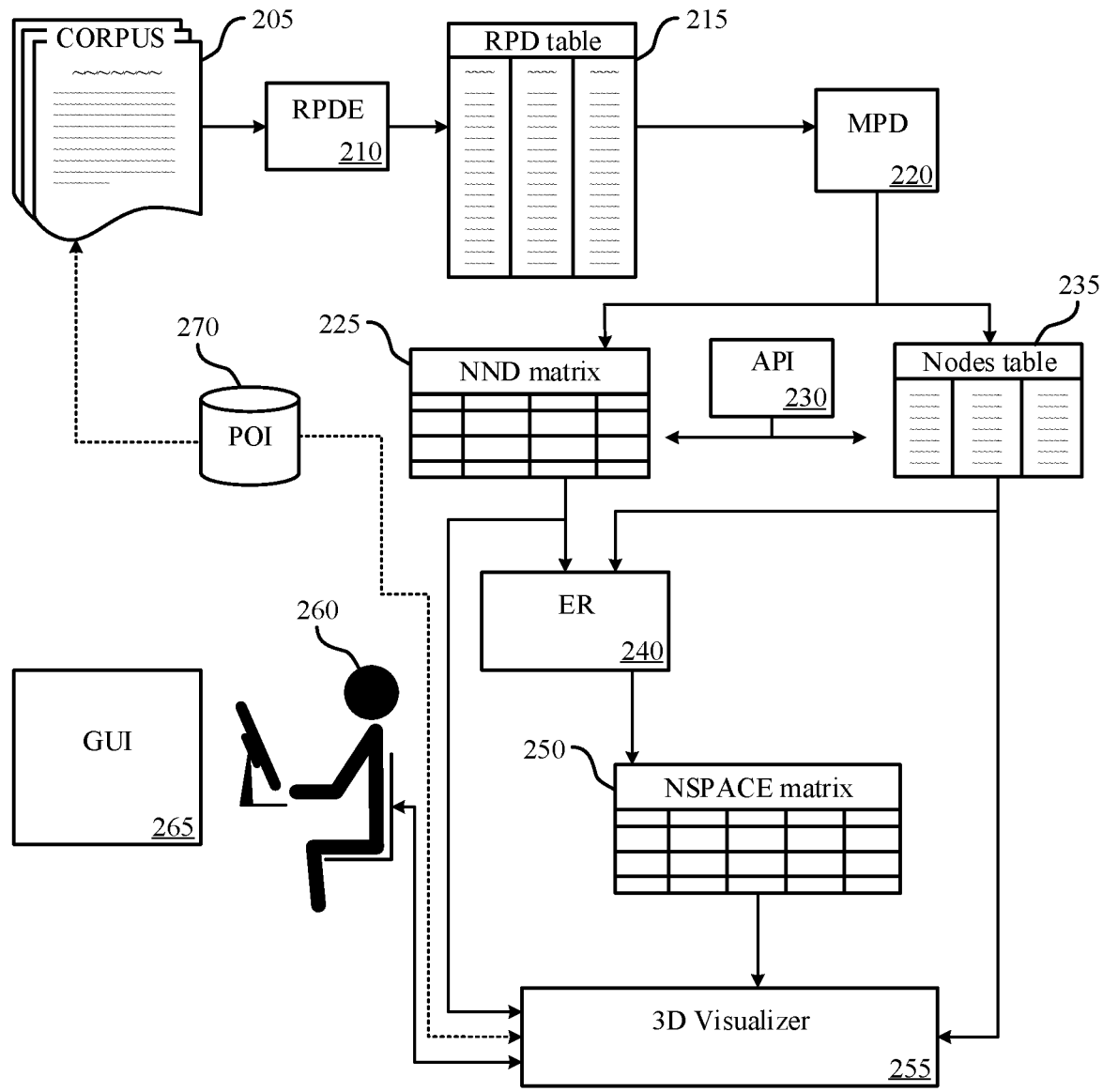

FIG. 2 illustrates an example of a text analysis system that supports data analysis and visualization for enterprise search in accordance with aspects of the present disclosure. FIG. 2 includes an illustration of the relationships between text corpus 205, RPD module 210, RPD table 215, MPD module 220, NND matrix 225, Application Programming Interface (API) 230, Nodes table 235, ER module 240, NSPACE matrix 250, 3D visualizer 255, user 260, graphical user interface (GUI) 265, and Passages of Interest (POI) 270.

Text corpus 205 may be an example of, or incorporate aspects of, text corpus 405 as described with reference to FIG. 4. RPD module 210 may be an example of, or incorporate aspects of, RPD module 115 as described with reference to FIG. 1. RPD table 215 may be an example of, or incorporate aspects of, RPD table 430 and 605 as described with reference to FIGS. 4 and 6.

MPD module 220 may be an example of, or incorporate aspects of, MPD module 120 as described with reference to FIG. 1. NND matrix 225 may be an example of, or incorporate aspects of, NND matrix 615 as described with reference to FIG. 6. Nodes table 235 may be an example of, or incorporate aspects of, Nodes table 610 as described with reference to FIG. 6.

ER module 240 may be an example of, or incorporate aspects of, ER module 125 as described with reference to FIG. 1 and more completely defined in FIG. 7. 3D visualizer 255 may be an example of, or incorporate aspects of, 3D visualizer 130 as described with reference to FIG. 1.

Each text item in the text corpus 205 is broken down into a sequential list of terms. A moving co-locational window (of size winsize) is used to create raw term-term pairs from the term list, whose distances are stored in the RPD table 215. Important terms are determined and used to create the Nodes table 235. The RPD table 215 is also used to create the NND matrix 225. An API 230 can be called to insert externally derived Nodes and NND at this point in the process.

The ER process is run against the NND matrix 225 and Nodes tables 235, which calculates a point in n-dimensional space for each node such that the node-node distances found in the NND table match as closely as possible. The output from ER, the coordinates for each node, are recorded in the NSPACE matrix 250. The 3D Visualizer 255 is used by the user 260 to visualize and interact with the node data in the NSPACE matrix 250.

The user 260 can rotate, pan and zoom in/out of the NSPACE data, plus select nodes for quick filtering and reading of the related corpus passages. The 3D Visualizer 255 can also highlight hidden relationships between selected nodes, which are calculated to dimensions beyond 3D.

The text corpus 205 can be any set of unstructured text. It could be text from database fields such as comments, descriptions, etc. It can also be a single large document, or a set of documents. The methods described can work against any text corpus 205 of sufficient size. The methods of the present disclosure are not semantic based, but instead considers terms (words) as mathematical symbols. In the preferred embodiment of the invention, the starting point is a subset of the corpus, which is the return set from a search.

In one example, a return set from a search of a large corpus results in a number of passages of text. Each passage in the return set is called a Passage of Interest or POI 270. Each POI 270 is a snippet of text. In one embodiment, the POI 270 is approximately 320 terms in length. There will often be hundreds or thousands of POI 270 in one return set. These POI 270 are related in that they are the results of a single search, but will often cover a wide range of content, especially if formed from a large enterprise corpus.

The present disclosure utilizes the idea of a co-locational window, called winsize. The variable winsize is an integer value between 2 and 128, although there is no theoretical upper limit. In the corpus, if 2 terms are within winsize terms of each other, they are considered related. A larger winsize translates to a higher resolution but at a higher computational cost. The density of the language comes into play here. The density is a subjective measure of the degree of technical terms to a given volume of text. The density will change with the domain of the corpus. A good practical value of winsize is 32 for technical text, such as that found at a power plant. A larger value should be used for domains where there are fewer technical terms per volume of text. Once the winsize has been set, the invention can begin to process a large text set starting with the RPD process.

While the exemplary systems and methods are described as being performed on a corpus that includes different types of terms, including words, numbers, identification terms, etc., it will be understood by those of ordinary skill in the art that the general systems and methods described herein may also be applied a corpus of differing composition. In some examples, the corpus is comprised only of number terms. For example, the systems and methods can be used to analyze and organize a corpus of terms including telephone call data where each called number is associated with a calling number.

Figure 3:
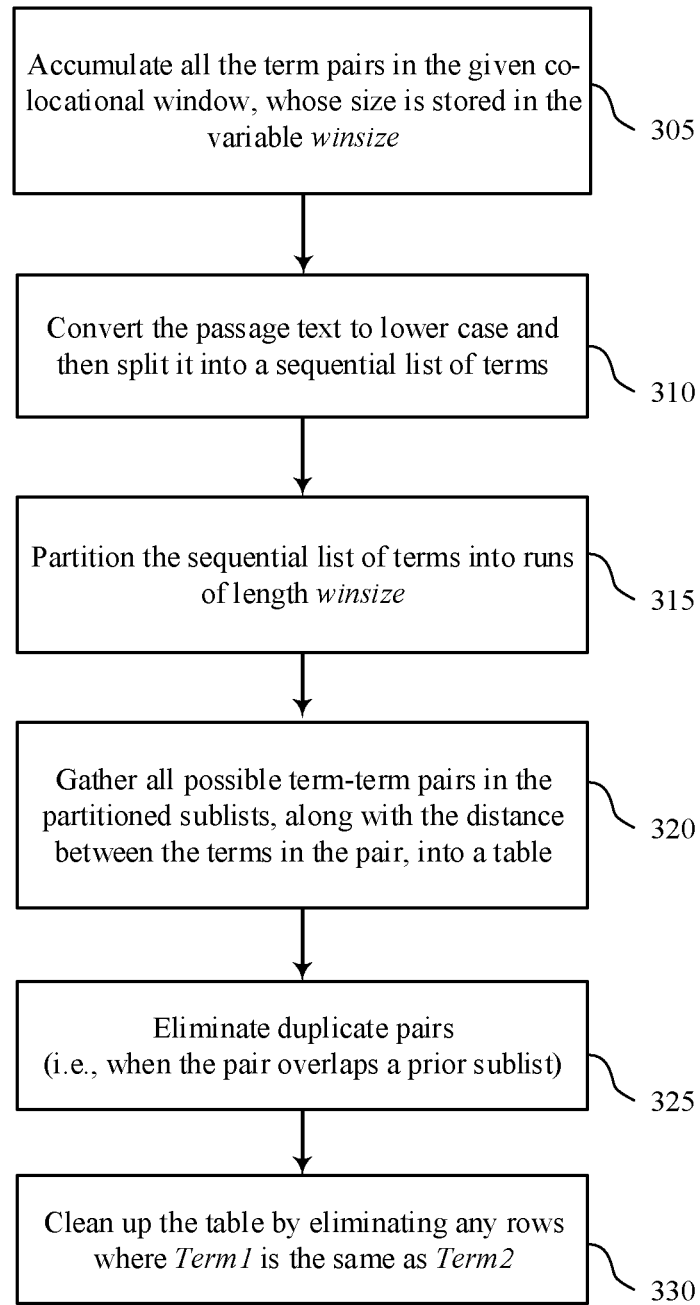
FIGS. 3 and 4 illustrate examples of a process performed by a Raw Pair Distance (RPD) module for data analysis and visualization for enterprise search in accordance with aspects of the present disclosure.

FIG. 3 illustrates an example of a process performed by an RPD module for data analysis and visualization for enterprise search in accordance with aspects of the present disclosure. In some examples, an RPD module may execute a set of codes to control functional elements of the RPD module to perform the described functions. Additionally or alternatively, an RPD module may use special-purpose hardware. These operations may be performed according to the methods and processes described in accordance with aspects of the present disclosure. For example, the operations may be composed of various substeps, or may be performed in conjunction with other operations described herein.

This process takes a corpus of text and produces an RPD table. It accumulates all the term pairs in a portion of text and within the given co-locational window, defined by winsize, which may typically be an integer value between 2 and 128 (although there is no theoretical limit). The RPD process includes the following steps.

At block 305 the RPD module may receive a corpus of text and accumulate all the term pairs in the given co-locational window, whose size is stored in the variable winsize.

At block 310 the RPD module may convert the passage text to lower case and then split it into a sequential list of terms.

At block 315 the RPD module may Partition the sequential list of terms into runs of length winsize.

At block 320 the RPD module may gather all possible term-term pairs in the partitioned sublists, along with the distance between the terms in the pair, into a table.

At block 325 the RPD module may eliminate duplicate pairs (i.e., when the pair overlaps a prior sublist).

At block 330 the RPD module may clean up the table by eliminating any rows where Term1 is the same as Term2.

Figure 4:
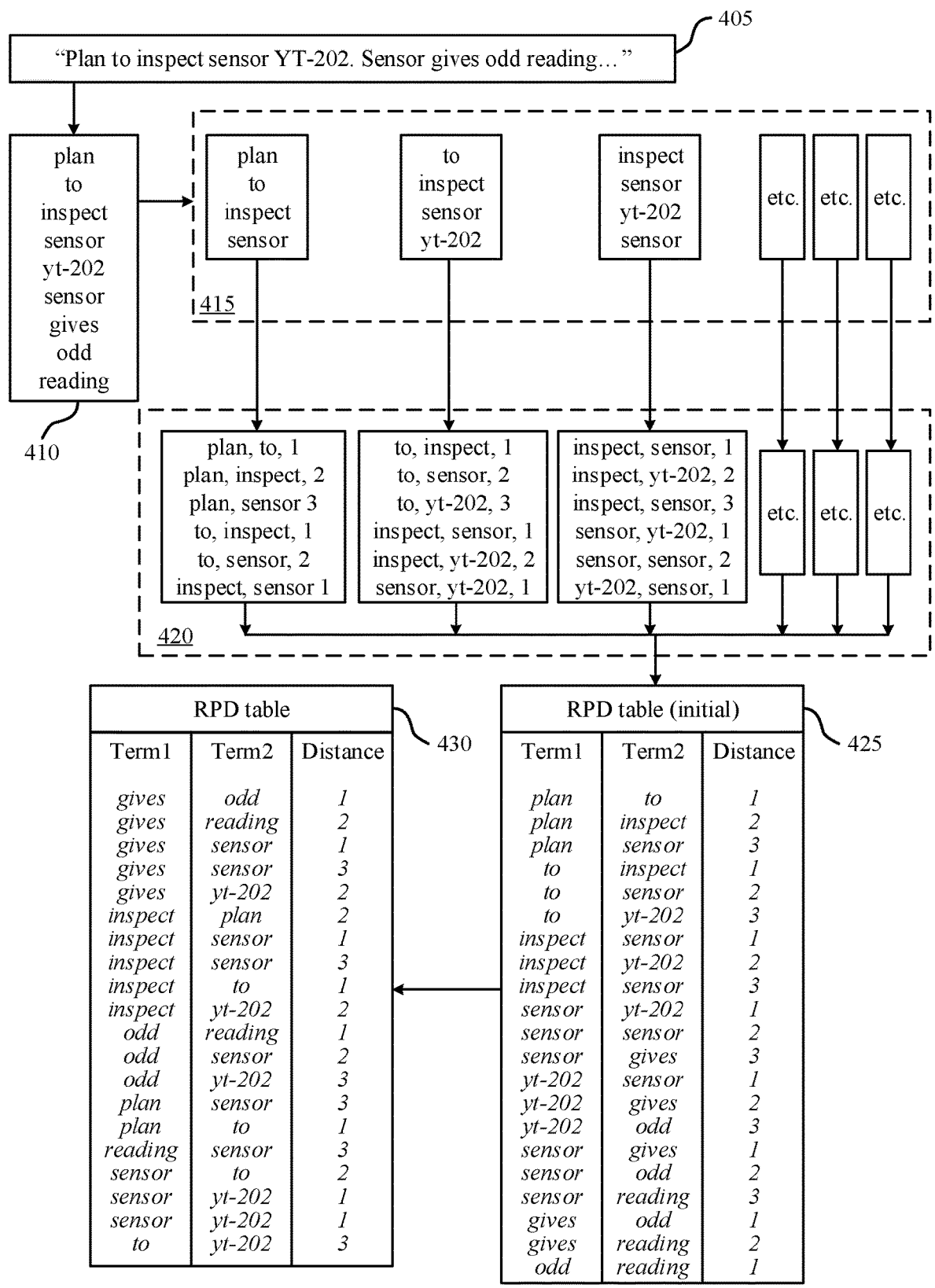

FIG. 4 illustrates an example of an RPD process that supports data analysis and visualization for enterprise search in accordance with aspects of the present disclosure. FIG. 4 includes illustrations of text corpus 405, sequential list 410, list partition 415, pair distances 420, initial RPD table 425, and RPD table 430.

Text corpus 405 may be an example of, or incorporate aspects of, text corpus 205 as described with reference to FIG. 2. RPD table 430 may be an example of, or incorporate aspects of, RPD table 215 and 605 as described with reference to FIGS. 2 and 6.

First, for each text passage (or document), the text of the passage is converted to lower case and then split into a sequential list 410 of terms. Whitespace (a space, comma, period, question mark, new line, etc) is used to separate terms.

Second, the sequential list 410 of terms is partitioned into list partition 415 including sublists of length winsize. In the example given in the diagram, a winsize of 4 is used for illustration purposes. The number of sublists will be equal to the number of terms in the text minus winsize plus 1. Hence, from the diagram, the input text is "Plan to inspect sensor YT-202. Sensor gives odd reading . . . " has 9 terms so this step will produce 6 (i.e. 9 terms−4 winsize+1) sublists as shown in the list partition 415.

Third, all possible term-term pairs in each sublist of the list partition 415 are used to generate pair distances 420. The process tracks the distance as an integer value of the term-term distance. For instance, the term "inspect" and "YT-202" are separated from each other by 2. The exact results of this operation is shown in the pair distances 420 of FIG. 4.

Fourth, all unique pair distances 420 are accumulated into initial RPD table 425. That is, the process in the third step may overstate term-term pairs, and these are then eliminated. This RPD table 425 will become quite large. For instance, if a winsize of 32 is used against 256 passages each with 320 words, then the RPD table 425 will have on the order of 5 million rows in it.

Finally, the initial RPD table 425 is cleaned up by eliminating any row where Term1 is the same as Term2. The result is the RPD table 430. There may be many rows in the final RPD table 430 where the term pairs are the same, but with differing distances. These pair-distance rows are taken as the evidence of the relationship between the terms in the pair. Hence, the RPD table 430 is a record of repeated experimental measurements of the relationship between the terms of the pair. Numerical examination of the measurements show that there are statistically significant differences between pairs in a sufficiently large corpus.

Figure 5:
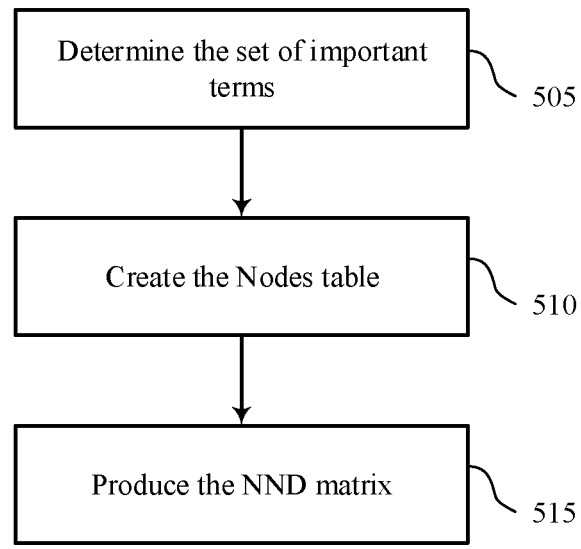
FIGS. 5 and 6 illustrate examples of a process performed by a Mean Pair Distance (MPD) module for data analysis and visualization for enterprise search in accordance with aspects of the present disclosure.

FIG. 5 illustrates an example of a process performed by an MPD module for data analysis and visualization for enterprise search in accordance with aspects of the present disclosure. In some examples, an RPD module may execute a set of codes to control functional elements of the RPD module to perform the described functions. Additionally or alternatively, an RPD module may use special-purpose hardware. These operations may be performed according to the methods and processes described in accordance with aspects of the present disclosure. For example, the operations may be composed of various substeps, or may be performed in conjunction with other operations described herein.

At block 505 the RPD module may determine the set of important terms. The upper limit for the number of important terms may be arbitrary, (e.g., 200, if the 3D Visualizer has a practical limit in that range). There will be many terms to choose from, as the input RPD table may have millions of rows, containing tens of thousands of unique terms. An example method to choose important terms may be to calculate their OE ratio, which is a measure of the observed occurrence count for a term compared to its expected count. Important terms may have a higher OE ratio At block 510 the RPD module may create the nodes table. The mass for each important term may be computed as the number of occurrences of the term in column 1 or 2 of the RPD table.

At block 515 the RPD module may produce the NND matrix. An RPD row may only be of interest if both terms in the row, i.e. Term1 and Term2, are important. All others may be ignored. Then the list of distances for repeating term pairs in the RPD table are averaged and recorded in the NND, column three called Distance (wherein the value recorded is the distance value). The term pairs in the NND are translated to their integer nodeid value as found in the Nodes table. The strength value is the addition of the masses of the pair terms divided by their distance.

Figure 6:
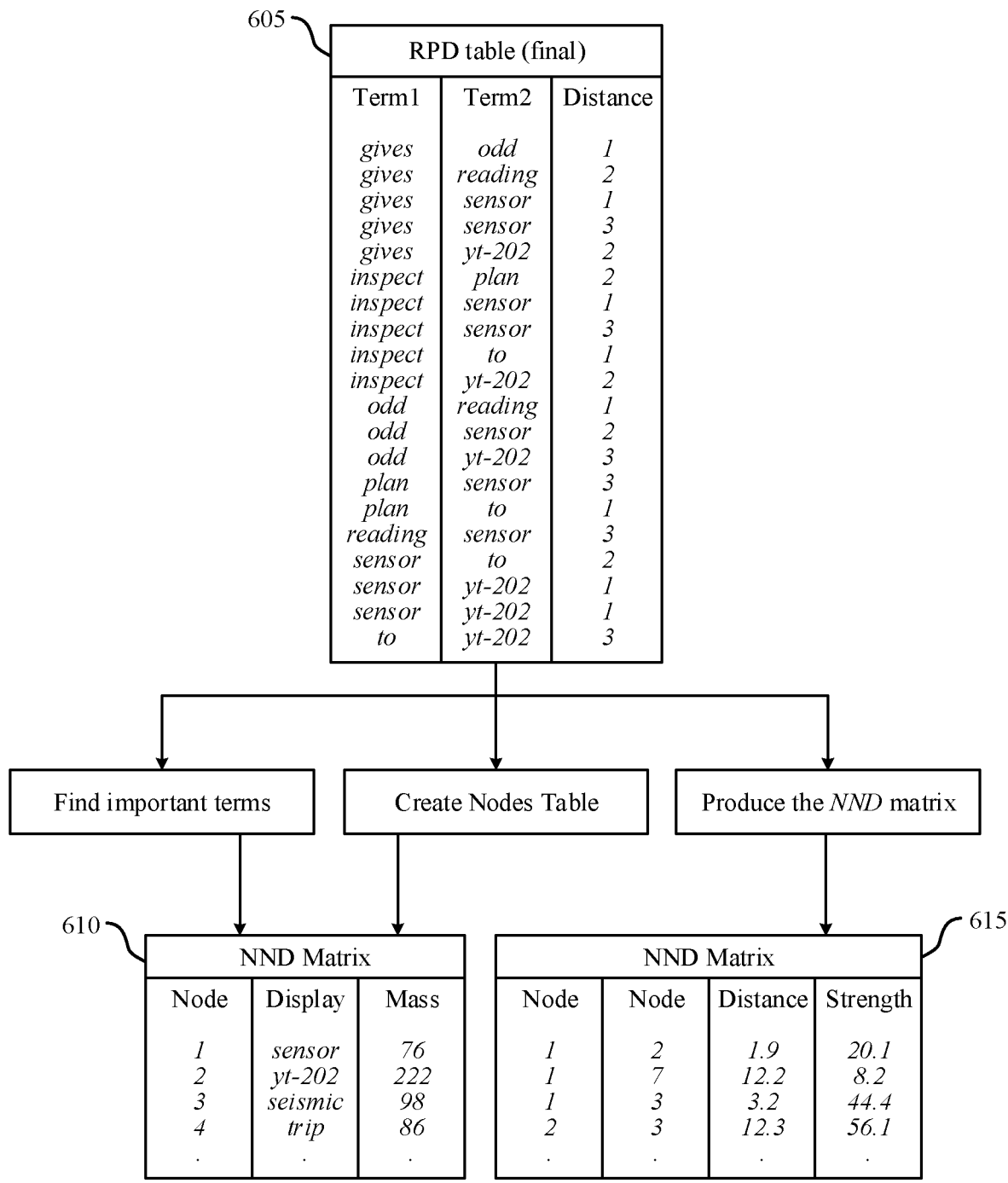

FIG. 6 illustrates an example of a MPD process that supports data analysis and visualization for enterprise search in accordance with aspects of the present disclosure. FIG. 6 includes illustrations of RPD table 605, Nodes table 610, and NND matrix 615.

RPD table 605 may be an example of, or incorporate aspects of, RPD table 215 and 430 as described with reference to FIGS. 2 and 4. Nodes table 610 may be an example of, or incorporate aspects of, Nodes table 235 as described with reference to FIG. 2. NND matrix 615 may be an example of, or incorporate aspects of, NND matrix 225 as described with reference to FIG. 2.

The MPD process takes the RPD table 605 as input and produces the Nodes table 610 and the NND matrix 615. (For the purposes of this disclosure, a table contains alphanumeric information, whereas a matrix must only contain numeric information.) The Nodes table 610 allows the invention to translate from the node number to the node name (the term).

The first step in the MPD process is to determine the set of important terms. The upper limit for the number of important terms is arbitrary. These important terms will be displayed later by the NSPACE visualizer, and it has a practical limit of 200 or so. There will be many terms to choose from, as the RPD table 605 will often contain millions of rows. Each row will have a pair of terms. There will be many, many repeating pairs throughout. Commonly there will be tens of thousands of unique terms. It will be difficult (i.e. take a long time) for the next process (ER) to handle more than a few hundred terms. It is critical to feed the ER process important terms, i.e. those terms that form the core of the meaning of the corpus. There are several strategies for doing this.

One strategy to choose important terms from the thousands available is to simply do a tally count of each term's occurrences. Very common words such as the term "the" will want to be rejected. A partial list may include: {the, a, it, in, into, to, too, at, so, . . . } Once these common terms are eliminated, the rest can be sorted by the number of occurrences and the top 200 taken, but not any terms that occur only once. This may work for some corpus domains. In some cases, each term is graded according to the ratio of its observed over its expected occurrences. This is possible because a dictionary of the corpus, a Vocabulary of Interest (VOI), may be constantly computed as text is added to the system. This is simply a count of the occurrences of a term for a given volume of text and is a feature of the search engine at use at the power plant. This dictionary returns the frequency a real number, say, 3.4, which means that the term was found, on average, 3.4 times per 100,000 terms. This number forms the expectation for the term. This information is either pre-computed or constantly computed.

With a VOI dictionary of frequency expectation for terms, it is possible to grade each unique term found in either Term1 or Term2 of the RPD table. Since the volume of passage text is a constant for all terms, the OE (observed versus expected) ratio can be computed as the term's observed count divided by its corpus frequency. A higher OE ratio means that the term is observed in the passages more than expected, and so is more important than a term with a lower OE ratio. Terms that occur only once, even those with large OE ratios, should be eliminated to reduce low sampling errors.

Once a list of important terms has been determined, the Nodes table 610 can be created. The Nodes table 610 is simply a table of the important terms, where each term is assigned an identifying integer value, starting at 1, as its nodeid. The second column contains the term, and the third column contains the term's mass (mass value). The mass is computed as the number of occurrences of the term in column 1 or 2 of the RPD table 605. Alternatively, the mass can be the OE ratio for the term.

Finally, the MPD process can produce the NND matrix 615. It is a summary of the RPD table 605, processed as follows. First, the RPD table 605 will have millions of rows, many of which are not needed, because an RPD table row will only be of interest if both Term1 and Term2 are in the second column of the Nodes table 610. In other words, any pair of terms in the RPD table which contain a non-important term is no longer of interest. In some examples, the list of distances for repeating term pairs in the RPD table may be averaged. This average distance is recorded in the NND, column three called Distance. The Strength is the addition of the masses of the pair terms divided by their Distance. The term pairs in the NND are translated to their integer nodeid value as found in the Nodes table 610.

Figure 7:
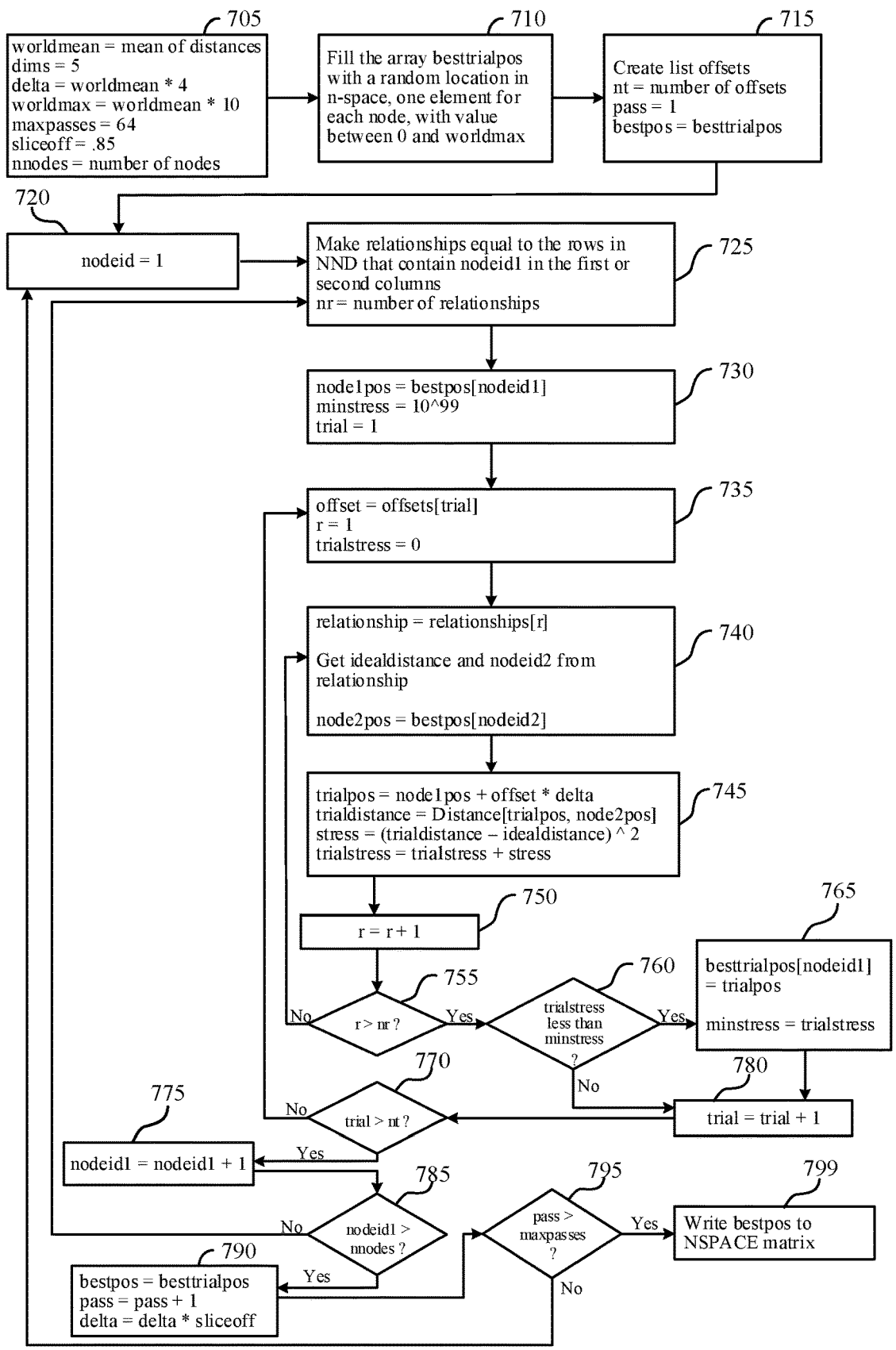
FIG. 7 illustrates an example of a process performed by an energy reduction (ER) module for data analysis and visualization for enterprise search in accordance with aspects of the present disclosure.

FIG. 7 illustrates an example of a process performed by an ER module for data analysis and visualization for enterprise search in accordance with aspects of the present disclosure. In some examples, an ER module may execute a set of codes to control functional elements of the ER module to perform the described functions. Additionally or alternatively, an ER module may use special-purpose hardware. These operations may be performed according to the methods and processes described in accordance with aspects of the present disclosure. For example, the operations may be composed of various substeps, or may be performed in conjunction with other operations described herein.

The ER process takes an NND matrix and a Nodes table as input. In practice, a NND matrix will have 200 or more nodes, and if every node had a relationship with every other node, there would be 200 squared (40,000) rows. However, as nodes are terms, and not all terms have a relationship to all other terms, a typical NND matrix will have a few thousand rows. The data in NND represents the relationships found in the text, however it may not be intuitively obvious how to utilize this data. That is, a table filled with numbers and containing thousands of rows may be very difficult to understand.

Thus, the present disclosure provides a method to quickly return and understand a large data set. Consider the NND matrix, which is an evidentiary summary of all the relationships found in the returns. The method enables a user to quickly understand and explore the NND matrix.

The data in the NND matrix can be viewed as a mathematical object called a network. Each row in the matrix describes the mean distance between a pair of words, as found in the return set. Nodes are expressed as integers, starting at 1 and increasing to the number of important terms as determined by the MPD process above. Each node represents a term (word), but is left in numerical form to ensure that the ER process is only fed matrices of numbers. This may enhance process performance as it may be coded in a low level language (e.g., for GPUs).

While an energy reduction percentage, as shown below in the last column of the Table 1 (shown below), may be a good way to understand the general idea of energy reduction, it is not a precise measurement methodology in the determination of model fitness. For instance, for any given pair of NND and NSPACE related matrices, the percentage of reduction will vary depending upon the starting random positions of the nodes in the NSPACE set. A more precise method is to compute the "confusion factor", in which a high factor will indicate a poor fit.

The confusion factor gives an absolute "percentage of fit" for the NSPACE model when compared to the NND data. For instance, a confusion factor of 0% would mean that the distances between the nodes in NSPACE exactly match the desired distances found in NND, meaning that the ER process did a perfect job of reducing the energy in the NND matrix: in this case the NSPACE matrix is an exact model of the NND data. A more likely confusion factor is, say, 50%, which means that on average, there is a 50% disagreement between the desired distance versus the energy reduced distance. Note that a reduced distance of either 5 or 15 will result in a confusion factor of 50% when compared to a desired distance of 10.

Typical confusion factors for energy reductions of a corpus produced from technical domains may be between 10% to 80%, and will decline with the higher dimensional reductions. A confusion factor can exceed 100% if the energy reduction struggles to produce a coherent model from the NND, but even these may be useful for viewing in the 3D visualizer. In some cases, random arrangement of terms in 3D space will have much higher confusion factors.

The process for computing the confusion factor may be as follows: For each same node-node distance in both NND and NSPACE, the absolute difference is averaged:

$$\text{confusion factor} = \frac{1}{nd}\sum_{k=1}^{nd} \frac{|NNDdistance_k - nspacedistance_k|}{NNDdistance_k}$$

Where nd is the number of distances in NND and nspacedistance$_k$ is computed from the node locations found in the NSPACE matrix. That is, NND is a node pair table and NSPACE is a node location table, so that NND$_k$ gives the desired distance directly, whereas the nodes in the pair must be looked up and the distance computed via the NSPACE matrix to give nspacedistance$_k$. The confusion factor is often expressed as a percentage by multiplying the above result by 100.

At block 705 the ER module may initialize the variables worldmean, dims, delta, worldmax, maxpasses, sliceoff, and nnodes. The variable worldmean is set to a value of the mean of the Distance (column 3) of the NND matrix. The variable dims in the current example is set to 5, but the process works in any number of dimensions from 2 upwards. Each additional dimension will increase processing time by 3 times, due to the explosion in size of the offsets variable. The variable delta in this example is set to an initial value of 4 times the worldmean. The variable sliceoff gives the multiplier to the variable delta for each pass. This process is a variation on Newton's Method, with a constantly shrinking delta. The variable delta is reduced each pass by sliceoff, hence, after maxpasses passes, delta will have been reduced by sliceoff^maxpasses, which computes to, in the present example, 0.0000303956 when sliceoff is 0.85 and maxpassses is 64.

At block 710 the ER module may fill the besttrialpos array with random locations. The array besttrialpos is initially filled with random locations for each node in n-space. If dims is 5, then each node is assigned a beginning random location with a vector in five-dimensional space. Each value in the vector should be a random number between 0 and worldmax. This array will be updated with the best trial position for the node for that pass. There is one array element for each node, so that, for instance, besttrialpos[42] has the best trial position (so far) for node 42.

At block 715 the ER module may create the list offsets. The variable offsets contains an array of n-dimensional vectors, where each element of a vector is one of three values: {−1, 0, 1}. The array offsets contains every possible combination of {−1, 0, 1} for the dimensional space defined by dims. For instance, if dims is 2, then offsets is:

{{−1, −1},{−1,0},{−1,1},{0, −1},{0,0},{0,1},{1, −1},{1, 0},{1,1}}.

If dims is 3, then offsets is:

{{−1, −1, −1},{−1, −1,0},{−1, −1,1},{−1,0, −1},{−1,0, 0},{−1,0,1},{−1,1, −1},{−1,1,0},{−1,1,1},{−1, −1},{0, −1,0},{0, −1,1},{0,0, −1},{0,0,0},{0,0,1},{0,1, −1},{0,1, 0},{0,1,1},{1, −1, −1},{1, −1,0},{1, −1,1},{1,0, −1},{1,0, 0},{1,0,1},{1,1, −1},{1,1,0},{1,1,1}}.

The offsets parameter has a length of 3^dims, and since the process must loop through each vector in the offsets array, its length is responsible for the 3X run time expansion as a dimension is added onto dims.

To prevent the process from "chasing its tail", two node position arrays are required, so that the best node positions are stable for each pass. The besttrialpos array will contain a shifting estimation of the best position for the node within the pass. The array bestpos will contain the best stable node position estimates for the node and will remain unchanged for a given pass. At this point, the array bestpos is set to the values in the besttrialpos array, and this means that the best guess for a node's position is the random value calculated for besttrialpos in block 710.

At block 720 the ER module may set the nodeid index equal to one.

At block 725 the ER module may make the relationships variable equal to the rows in NND. The variable relationships is a select of all the rows in the NND matrix that contain the node number in variable nodeid1. A row should be selected if nodeid1 appears in either the first or second column of the NND matrix. Essentially, relationships is a list of all the connections that nodeid1 has to all other nodes.

At block 730 the ER module may initialize the variables nodelpos, minstress, and trial.

At block 735 the ER module may set the offset variable to the next vector. The offset variable is set to the next vector in the list of offsets. The offset variable is a vector of length dims and will be comprised of the elements {−1, 0, 1}. Later at block 745, this offset vector will be multiplied by delta to form an "offset" from the best node position.

At block 740 the ER module may determine the ideal distance for the term pairs. The innermost loop contains a crucial part of the process. A list of relationships for nodeid1 was created at block 725, and each relationship in the set of relationships is used to determine the ideal distance (idealdistance) for the term pairs. For example, from the given NND matrix, the second relationship (r=2) for nodeid1 of '1' is the second row of NND where there is a '1' in column 1, a '7' in column 2 and an idealdistance of 12.2 in column 3. nodeid2 would have a value of 7.

At block 745 the ER module may calculate the stress of a trial position for the node (nodeid1). The variable trialpos is the trial n-dimensional vector position for nodeid1. It is derived from the bestpos position for the node and then offset by delta * offset, which is a vector multiplication. The variable trialdistance is the distance from the trial position for the node to its paired node. In the preferred embodiment of the invention, this distance is the Euclidian distance in n-space, but it can be any other appropriate measurement of distance. The variable stress is a measurement of how different the actual distance for the pair is from the ideal distance and is the square of the difference. If the pair of nodes are closer than specified in the NND row, or if they are more distant than specified, then stress is increased.

For instance, from the NND example matrix, if nodeid1 is 1 and r is 2, then nodeid2 is 7 and the idealdistance is 12.2. The trialdistance will be a trial Euclidian distance between nodes 1 and 7, assuming that nodeid1 is offset from its last best position by the n-space vector offset. This trial distance will be compared to the ideal distance of 12.2. If the trial distance is 12.2, then stress will be zero, as there is no difference between the ideal distance and the trial distance. If the trial distance is too small or too big, stress will be the square of the difference.

At block 750 the ER module may increment the relationship index, r. At block 755 the ER module may compare the relationship index to the parameter nr.

At block 760 the ER module may compare the value of trialstress to the value of minstress. The variable trialstress is the accumulation of the stresses for all the relationships for nodeid1 (in the current trial position). It is compared to the value of minstress (which contains the smallest minstress seen to date), and if it beats it (is less than the previous best value), the trialpos is recorded in besttrialpos for nodeid1, and the minstress is set to the trialstress.

At block 765 the ER module may set the besttrialpos for the nodeid index and minstress. At block 770 the ER module may increment the trial index. At block 775 the ER module may compare the trial index to the number of trials, nt.

At block 780 the ER module may increment the nodeid index. At block 785 the ER module may compare the nodeid index to the nnodes variable.

At block 790 the ER module may copy the besttrialpos variable into the bestpos array. Each pass, the bestpos array will always contain the best (so far) positions for the nodes, so since the pass is now complete, the besttrialpos array values are copied into the bestpos array at this point in the process.

At block 795 the ER module may compare the pass index to the maxpasses parameter. At block 799 the ER module may complete the pass by writing the bestpos array to the NSPACE matrix. After all trial offsets are processed for all relationships for all nodes, the pass is complete and bestpos will contain the next best placement for the nodes. Placements will be refined to plus or minus the current delta value, which is squeezed to a smaller and smaller value with each pass in block 790. When all the passes have been processed, pass will exceed maxpasses and the bestpos array can be written to the NSPACE matrix in step 799.

To test the process, it may be useful to feed it a simple NND matrix and check the NSPACE output matrix. It may also be useful to enhance the algorithm to report the beginning and ending system stress—the amount stress that was in the system when the nodes were randomly located versus after, e.g., pass 64.

However, as the input matrix NND increases in complexity, it may not be possible for the ER algorithm to reduce all system stress to zero. Here is an exemplary chart of the percentage of stress reduction the ER algorithm achieved against randomly created NND matrices:

TABLE 1

Energy Reduction

| # | Number of Terms | Number of Relationships | Number of Dimensions | Number of Offsets | Energy Reduction % |
|---|---|---|---|---|---|
| 1 | 256 | 31,243 | 2 | 9 | 28.4 |
| 2 | 256 | 30,699 | 3 | 27 | 41.9 |
| 3 | 256 | 30,688 | 4 | 81 | 52.5 |
| 4 | 256 | 29,135 | 5 | 243 | 63.3 |
| 5 | 256 | 29,135 | 6 | 729 | 67.9 |
| 6 | 256 | 30,355 | 7 | 2187 | 76.7 |
| 7 | 256 | 29,135 | 8 | 6561 | 78.1 |

The NND matrices used to make Table 1 were created from sets of random nodal relationships. One way to minimize stress is to increase the dimensional complexity of the optimization, as shown in the fourth column. For each additional dimension that is computed, an additional degree of freedom is available for nodal movement, which has the effect of increasing the accuracy of the optimization.

Unlike the random NND data used above, in practice a text corpus will have a significantly higher degree of coherence, so ER is able to achieve higher reduction percentages. In other words, ER can give substantial reductions when there are patterns in the NND data. Even with random NND data, notice that using a dims of 8 instead of 2 increases the reduction from 28% to 78%.

In some cases, the computational speed of the algorithm may be proportional to maxpasses×nnodes×3^dims×(average number of relationships per node). In some embodiments, the energy reduction process may be used in the quantum computing domain of optimization.

Figure 8:
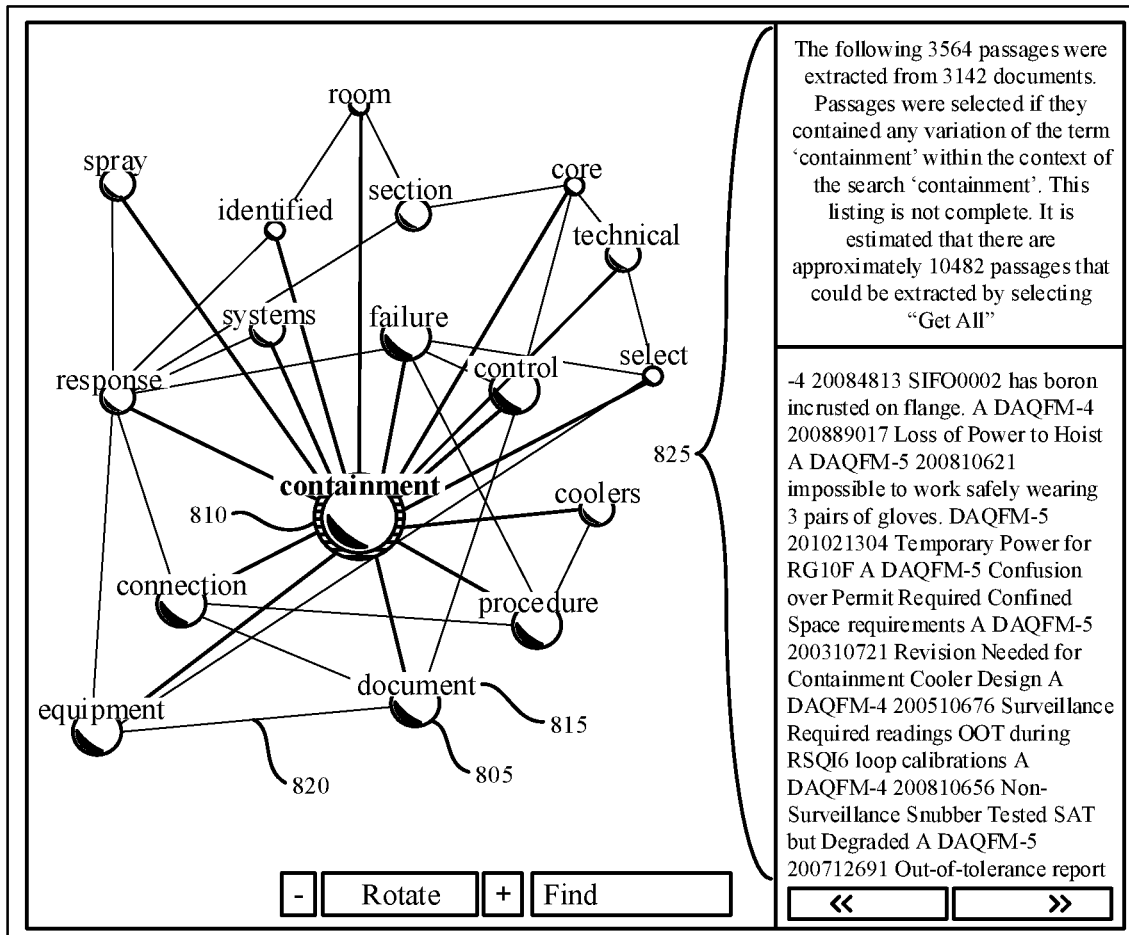
FIGS. 8 through 10 illustrate examples of a graphical user interface (GUI) that supports data analysis and visualization for enterprise search in accordance with aspects of the present disclosure.

FIG. 8 illustrates an example of a GUI that supports data analysis and visualization for enterprise search in accordance with aspects of the present disclosure. FIG. 8 includes illustrations of nodes 805, selected node 810, node text 815, connectors 820, and POI panel 825.

Nodes 805 may be an example of, or incorporate aspects of, nodes 905 and 1005 as described with reference to FIGS. 9 and 10. Selected node 810 may be an example of, or incorporate aspects of, selected node 910 and 1010 as described with reference to FIGS. 9 and 10. Node text 815 may be an example of, or incorporate aspects of, node text 915 and 1015 as described with reference to FIGS. 9 and 10.

Connectors 820 may be an example of, or incorporate aspects of, connectors 920 and 1020 as described with reference to FIGS. 9 and 10. POI panel 825 may be an example of, or incorporate aspects of, POI panel 925 and 1025 as described with reference to FIGS. 9 and 10.

Once the NSPACE matrix has been produced, it is ready to be displayed to the user via a GUI. The 3D Visualizer takes the n-dimensional coordinates of nodes 805 in NSPACE, along with the connections indicated in NND plus the Nodes data to produce an interactive experience for the user. The data is in n-dimensions, but only 3 can be displayed. The GUI may default to the first 3 dimensions but may allow the user to pick any three of those available. The visualization GUI gives a three-dimensional visual representation of the input data. It consists of nodes 805 placed at their respective positions and symbolized according to their mass, as well as connectors 820, each of which indicates a relationship between two nodes 805. Each node 805 has associated text, which shows a description key for the node 805.

In the illustrated example, a plurality of nodes 805 are displayed according to their relative coordinate locations in three-dimensional space. The nodes 805 are sized according to their previously calculated mass value, with a larger size indicating a larger mass of the node 805. Each connector 820 connects two nodes 805 of a node-node pair as previously determined. The graphical thickness of the connector 820 line indicates the strength of the nod-node pair as previously determined.

In some cases, the 3D visualizer generates the display using input data including the following: NSPACE Matrix of node coordinates in three or more dimensions along with ancillary node data (mass); NND Matrix of connections, i.e. for each node 805, a list of nodes 805 wherein each node 805 is connected to a connector 820, which also includes a measure of the strength of the connection/relationship; and Nodes table to turn node numbers into node terms. Nodes table also holds the mass for each node 805.

The 3D visualizer creates and maintains data for each generated visualization, such as metadata describing the particular visualization, including number of dimensions, node count, and POI search text. Style data may also be maintained, which includes maintained values for different user styles, for example: percent of nodes 805 rendered, connector opacity, a Boolean value indicating whether or not connectors 820 are symbolized with connection strength, connector color, node opacity, node scale, node color, text color, text scale, text opacity, and/or background color.

The 3D Visualizer may be configured for various user controls, including: dimensions (a text entry box which allows the user to choose which three of the supplied dimensions will be used to determine the node's position in world space in the current view); and Percent of Nodes Rendered (a slider which controls how many of the nodes

805 and their connections are visible based on the percentile of the node's mass within the distribution of all node masses).

User controls for connectors 820 may include: Connector Opacity (a slider which simultaneously alters all connector's opacity from 0-100%); Show Connector Strength (a toggle switch which when "on" specifies that connector opacities are chosen such that higher strength connections appear more opaque than lower strength connections—and when "off" causes the connector opacity slider to alter all connector opacities uniformly); and Connector Color (a text entry which, when applied, changes the color of all connectors based on the inputted RGB color value—the entry may be parsed with every keystroke to keep invalid entries from being applied).

Controls for node properties may include: Node Opacity (a slider which uniformly alters the opacity of all nodes from 0-100%); Node Scale (a slider which alters each nodes scale relative to its initial size); and Node Radius Range (a pair of text entries in which the user specifies the minimum and maximum node size—when applied, the software performs an affine transformation scaling each node 805 to fit within the minimum and maximum bounds relative to its initial size).

Text options controls may include: Text Opacity (a slider which uniformly alters the opacity of all text in the visualization from 0-100%); Text Size (a slider which alters each text element's scale relative to its initial size); Text Color (a text entry which, when applied, changes the color of all unselected nodes based on the inputted RGB color value); and Background Color (a text entry which, when applied, changes background color based on the inputted RGB color value).

A Load Style Dropdown menu may allow the user to choose from any of the styles they have previously saved to a database and alters the visualization's aesthetics accordingly. A Style ID Text entry allows the user to specify a text string identifier for the currently rendered style.

Other options controls may include a control for A.I. Sensitivity, activated only when there are one or more selected nodes 810 in the visualization. When the slider's value is changed, the 3D visualizer iterates through nodes 805 that are not currently visible due to not being connected to all currently selected nodes 810 and determines if the node 805 in question is within the n-dimensional distance specified by the slider from the selected nodes' n-dimensional centroid. If so, the node 805 is given a unique color to indicate its special status.

A Save Current Style option may be activated once Style ID contains a text string, This control may save the current rendered style in the database for the active user.

The POI panel 825 displays text of portions of the passages of interest with nodes bolded. The POI panel 825 may also show metadata for each passage, including passage date, source data set, source document type, and page of document on which the passage is found. The POI panel 825 may also Include a link to the source document for each passage of interest.

Thus, using the 3D Visualizer, the user can quickly and easily see relationships between terms, determine their relative quantity, instantly look at source text (Passages of Interest) with any combination of terms, and find hidden relationships existing in the ingested text corpus. Using these features, the user can intelligently decide whether to refine their search, and with what term(s) to do so. Or they can find that "needle in the haystack" by selecting terms, filtering the return set down quickly to the exact text of interest.

Figure 9:
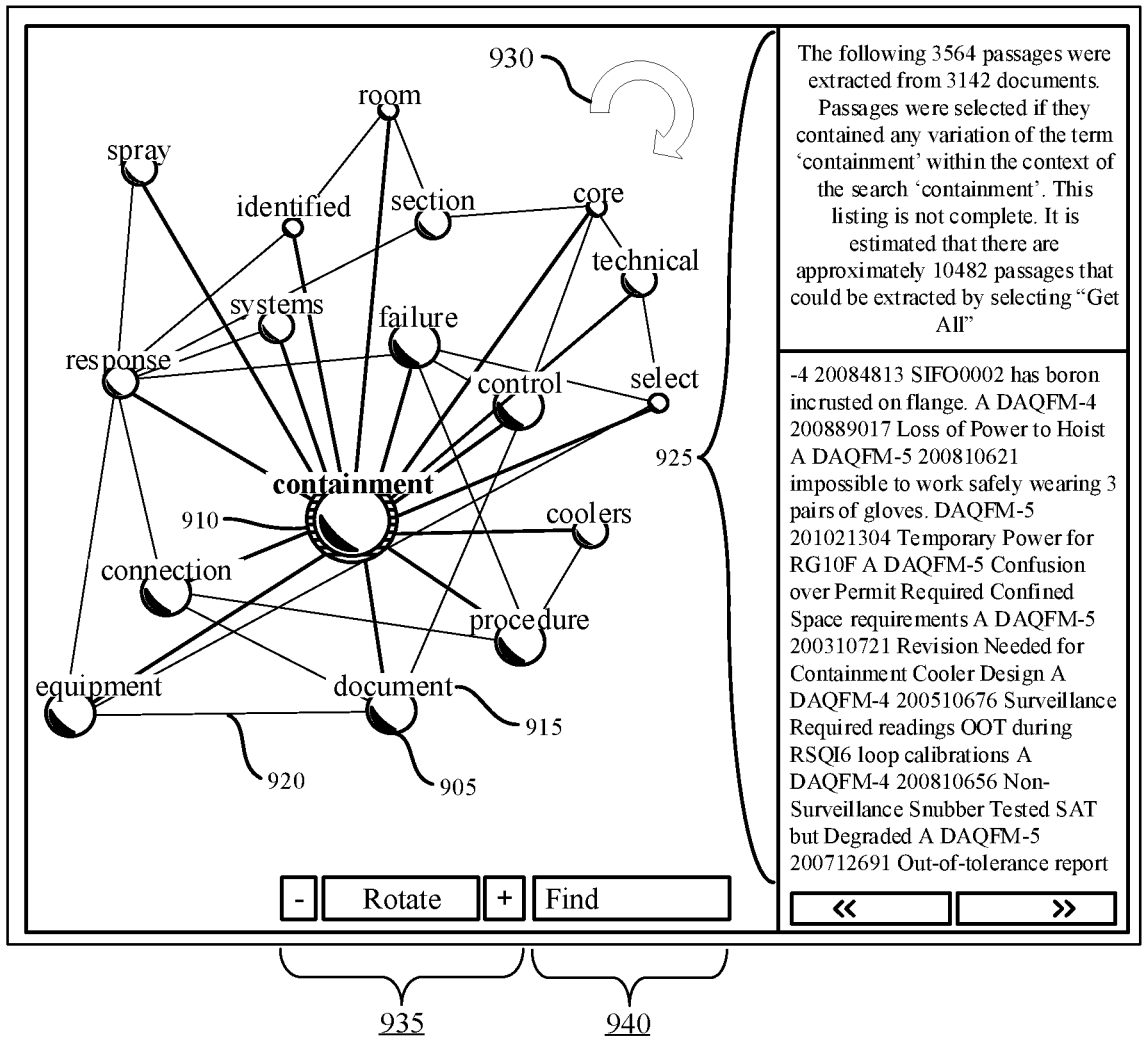

FIG. 9 illustrates an example of a GUI rotation function that supports data analysis and visualization for enterprise search in accordance with aspects of the present disclosure. FIG. 9 includes illustrations of nodes 905, selected node 910, node text 915, connectors 920, POI panel 925, direction of rotation 930, rotation controls 935, and Find text entry box 940.

The 3D Visualizer application may be configured to perform various actions on the visualization, such as visualization behaviors including: a click and drag motion (or tap and drag), which causes the nodes 905, connectors 920 and text to rotate about the current center of orbit in three-dimensional space; a click/tap on a node 905 causes that node 905 to become "selected"; a longer click/tap on a node 905 causes that nodes coordinates to become the new center of orbit (I.e. the coordinate location that is the center of rotation); or the keyboard keys "W", "A", "S", "D", "Q" and "E" can control the camera's coordinate location in space relative to the nodes 905.

The rotation controls 935 may include a Rotate control and a Rotate/Pause button may cause the visualization to start or stop rotating in three-dimensional space around its current center of orbit. The plus (+) button may increase the speed of this rotation, while the minus (−) button decreases the speed.

The 3D Visualizer application may also include a Find text entry box 940 which, when text is entered, may begin to assist the user in finding nodes 905 based on their text.

Nodes 905 may be an example of, or incorporate aspects of, nodes 805 and 1005 as described with reference to FIGS. 8 and 10. Selected node 910 may be an example of, or incorporate aspects of, selected node 810 and 1010 as described with reference to FIGS. 8 and 10. Node text 915 may be an example of, or incorporate aspects of, node text 815 and 1015 as described with reference to FIGS. 8 and 10. Connectors 920 may be an example of, or incorporate aspects of, connectors 820 and 1020 as described with reference to FIGS. 8 and 10. POI panel 925 may be an example of, or incorporate aspects of, POI panel 825 and 1025 as described with reference to FIGS. 8 and 10.

Figure 10:
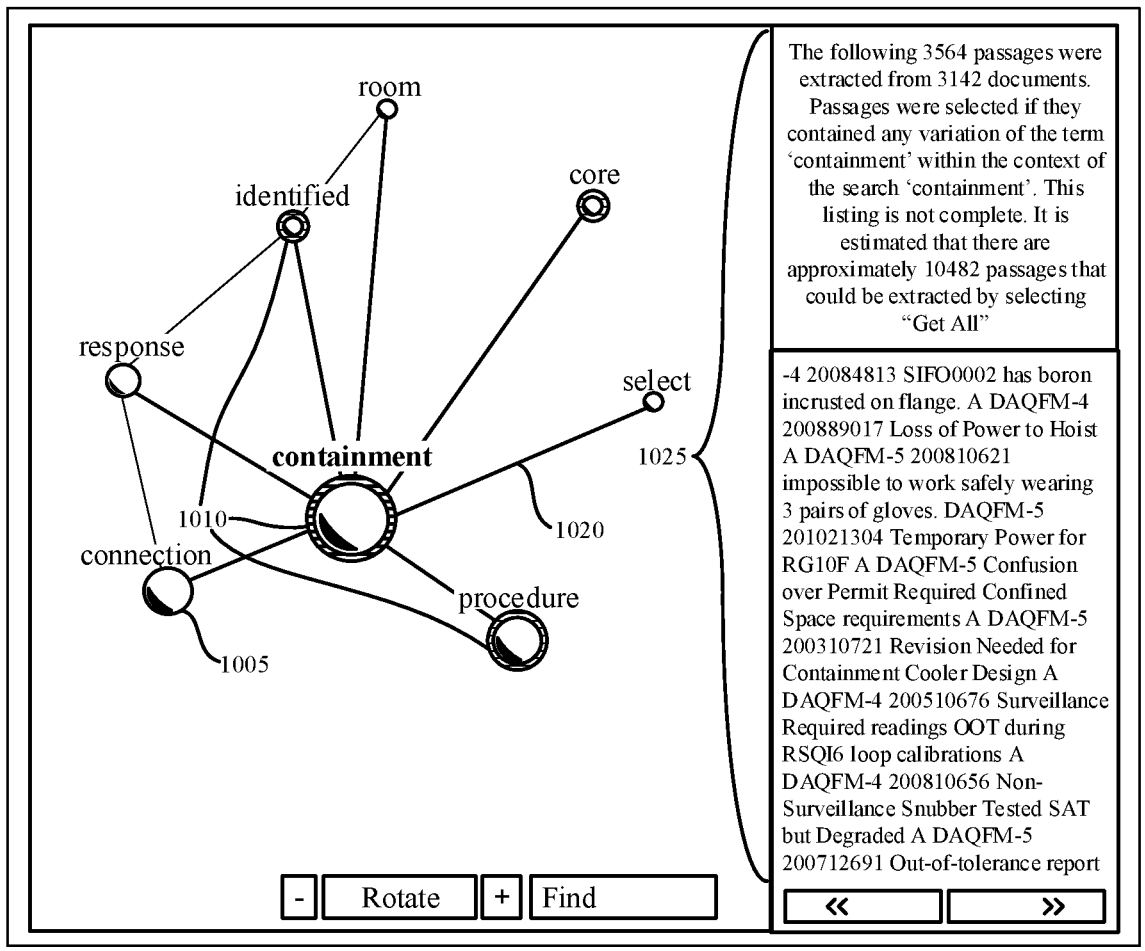

FIG. 10 illustrates an example of a GUI selection function that supports data analysis and visualization for enterprise search in accordance with aspects of the present disclosure. FIG. 10 includes illustrations of nodes 1005, selected node 1010, node text 1015, connectors 1020, and POI panel 1025.

A Selection Proximity Filter may be activated only when there are one or more selected nodes 10810 in the visualization. When the value is changed, the software iterates through each unselected node and sets its visibility based on the n-dimensional distance from the centroid of all selected nodes 1010 to that node 1005.

Nodes 1005 may be an example of, or incorporate aspects of, nodes 805 and 905 as described with reference to FIGS. 8 and 9. Selected node 1010 may be an example of, or incorporate aspects of, selected node 810 and 910 as described with reference to FIGS. 8 and 9. Node text 1015 may be an example of, or incorporate aspects of, node text 815 and 915 as described with reference to FIGS. 8 and 9. Connectors 1020 may be an example of, or incorporate aspects of, connectors 820 and 920 as described with reference to FIGS. 8 and 9. POI panel 1025 may be an example of, or incorporate aspects of, POI panel 825 and 925 as described with reference to FIGS. 8 and 9.

When a node 1005 is "selected", the following can occur: any nodes 1005 that do not share a connection with all selected nodes 1010 (there may be more than one) becomes invisible; connections for invisible nodes 1005 become invisible (conversely, when a node 1005 is deselected, all nodes 1005 are re-evaluated to determine if they share a connection with all selected nodes 1010 and visibility of the node 1005 is adjusted accordingly); and a "passages" panel appears which displays search POI which contain any variation of the terms for the selected nodes 1010.

Figure 11:
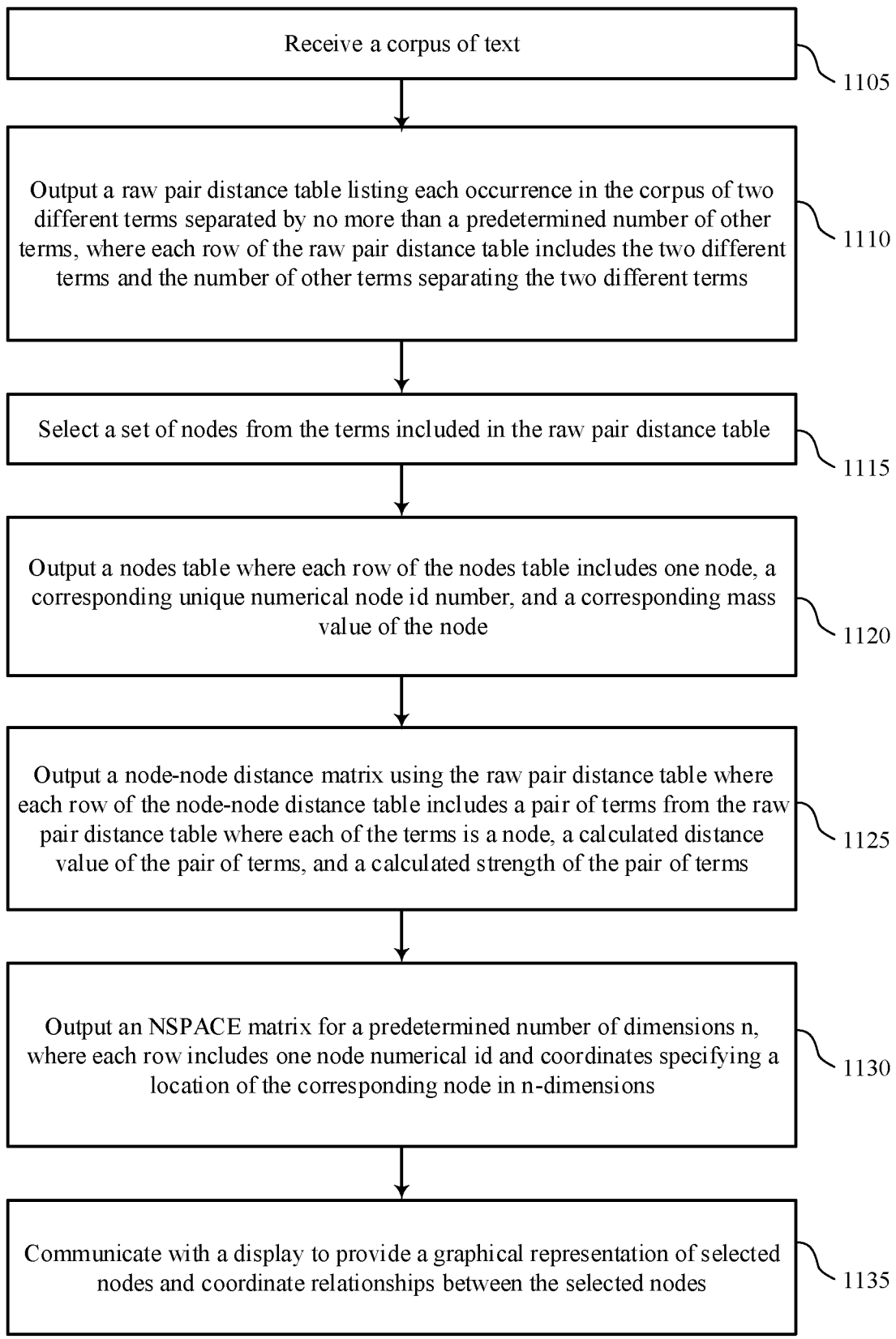
FIGS. 11 through 15 illustrate examples of processes performed by a text analysis system for data analysis and visualization for enterprise search in accordance with aspects of the present disclosure.

FIG. 11 illustrates an example of a process performed by a text analysis system for data analysis and visualization for enterprise search in accordance with aspects of the present disclosure. In some examples, a text analysis system may execute a set of codes to control functional elements of the text analysis system to perform the described functions. Additionally or alternatively, a text analysis system may use special-purpose hardware. These operations may be performed according to the methods and processes described in accordance with aspects of the present disclosure. For example, the operations may be composed of various sub-steps, or may be performed in conjunction with other operations described herein.

At block 1105 the text analysis system may receive a corpus of text. In certain examples, aspects of the described operations may be performed by RPD module 115 and 210 as described with reference to FIGS. 1 and 2.

At block 1110 the text analysis system may output a raw pair distance table listing each occurrence in the corpus of two different terms separated by no more than a predetermined number of other terms, wherein each row of the raw pair distance table includes the two different terms and the number of other terms separating the two different terms. In certain examples, aspects of the described operations may be performed by RPD module 115 and 210 as described with reference to FIGS. 1 and 2.

At block 1115 the text analysis system may select a plurality of nodes from the terms included in the raw pair distance table. In certain examples, aspects of the described operations may be performed by MPD module 120 and 220 as described with reference to FIGS. 1 and 2.

At block 1120 the text analysis system may output a nodes table wherein each row of the nodes table includes one node, a corresponding unique numerical node id number, and a corresponding mass value of the node. In certain examples, aspects of the described operations may be performed by MPD module 120 and 220 as described with reference to FIGS. 1 and 2.

At block 1125 the text analysis system may output a node-node distance matrix using the raw pair distance table wherein each row of the node-node distance table includes a pair of terms from the raw pair distance table wherein each of the terms is a node, a calculated distance value of the pair of terms, and a calculated strength of the pair of terms. In certain examples, aspects of the described operations may be performed by MPD module 120 and 220 as described with reference to FIGS. 1 and 2.

At block 1130 the text analysis system may output an NSPACE matrix for a predetermined number of dimensions n, wherein each row includes one node numerical id and coordinates specifying a location of the corresponding node in n-dimensions. In certain examples, aspects of the described operations may be performed by ER module 125 and 240 as described with reference to FIGS. 1 and 2.

At block 1135 the text analysis system may communicate with a display to provide a graphical representation of selected nodes and coordinate relationships between the selected nodes. In certain examples, aspects of the described operations may be performed by 3D visualizer 130 and 255 as described with reference to FIGS. 1 and 2.

Figure 12:
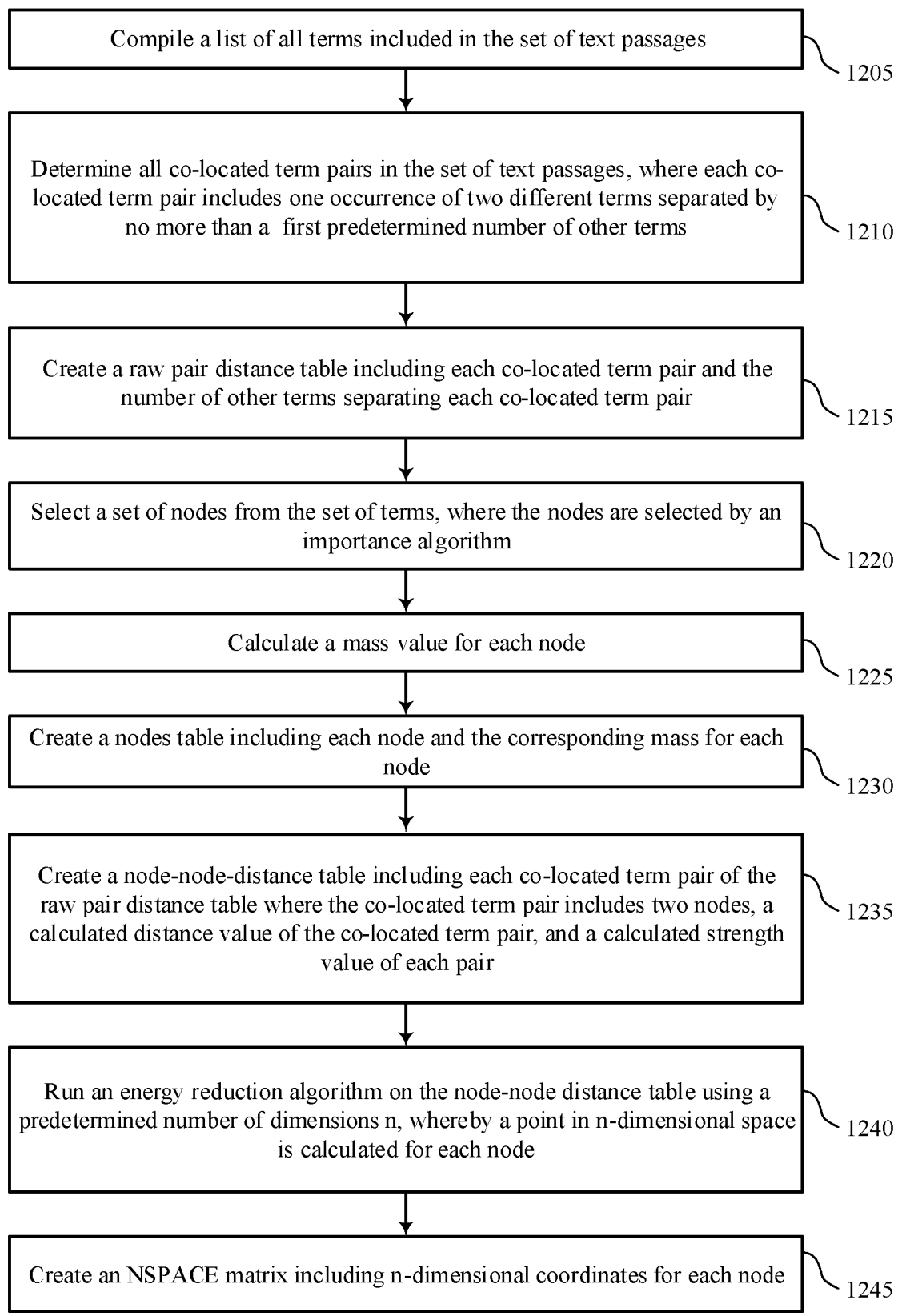

FIG. 12 illustrates an example of a process performed by a text analysis system for data analysis and visualization for enterprise search in accordance with aspects of the present disclosure. In some examples, a text analysis system may execute a set of codes to control functional elements of the text analysis system to perform the described functions. Additionally or alternatively, a text analysis system may use special-purpose hardware. These operations may be performed according to the methods and processes described in accordance with aspects of the present disclosure. For example, the operations may be composed of various sub-steps, or may be performed in conjunction with other operations described herein.

At block 1205 the text analysis system may compile a list of all terms included in the plurality of text passages. In certain examples, aspects of the described operations may be performed by RPD module 115 and 210 as described with reference to FIGS. 1 and 2.

At block 1210 the text analysis system may determine all co-located term pairs in the plurality of text passages, wherein each co-located term pair comprises one occurrence of two different terms separated by no more than a first predetermined number of other terms. In certain examples, aspects of the described operations may be performed by RPD module 115 and 210 as described with reference to FIGS. 1 and 2.

At block 1215 the text analysis system may create a raw pair distance table including each co-located term pair and the number of other terms separating each co-located term pair. In certain examples, aspects of the described operations may be performed by RPD module 115 and 210 as described with reference to FIGS. 1 and 2.

At block 1220 the text analysis system may select a plurality of nodes from the plurality of terms, wherein the nodes are selected by an importance algorithm. In certain examples, aspects of the described operations may be performed by MPD module 120 and 220 as described with reference to FIGS. 1 and 2.

At block 1225 the text analysis system may calculate a mass value for each node. In certain examples, aspects of the described operations may be performed by MPD module 120 and 220 as described with reference to FIGS. 1 and 2.

At block 1230 the text analysis system may create a nodes table including each node and the corresponding mass for each node. In certain examples, aspects of the described operations may be performed by MPD module 120 and 220 as described with reference to FIGS. 1 and 2.

At block 1235 the text analysis system may create a node-node-distance table including each co-located term pair of the raw pair distance table where the co-located term pair includes two nodes, a calculated distance value of the co-located term pair, and a calculated strength value of each pair. In certain examples, aspects of the described operations may be performed by MPD module 120 and 220 as described with reference to FIGS. 1 and 2.

At block 1240 the text analysis system may run an energy reduction algorithm on the node-node distance table using a predetermined number of dimensions n, whereby a point in n-dimensional space is calculated for each node. In certain examples, aspects of the described operations may be performed by ER module 125 and 240 as described with reference to FIGS. 1 and 2.

At block 1245 the text analysis system may create an NSPACE matrix including n-dimensional coordinates for each node. In certain examples, aspects of the described operations may be performed by ER module 125 and 240 as described with reference to FIGS. 1 and 2.

Figure 13:
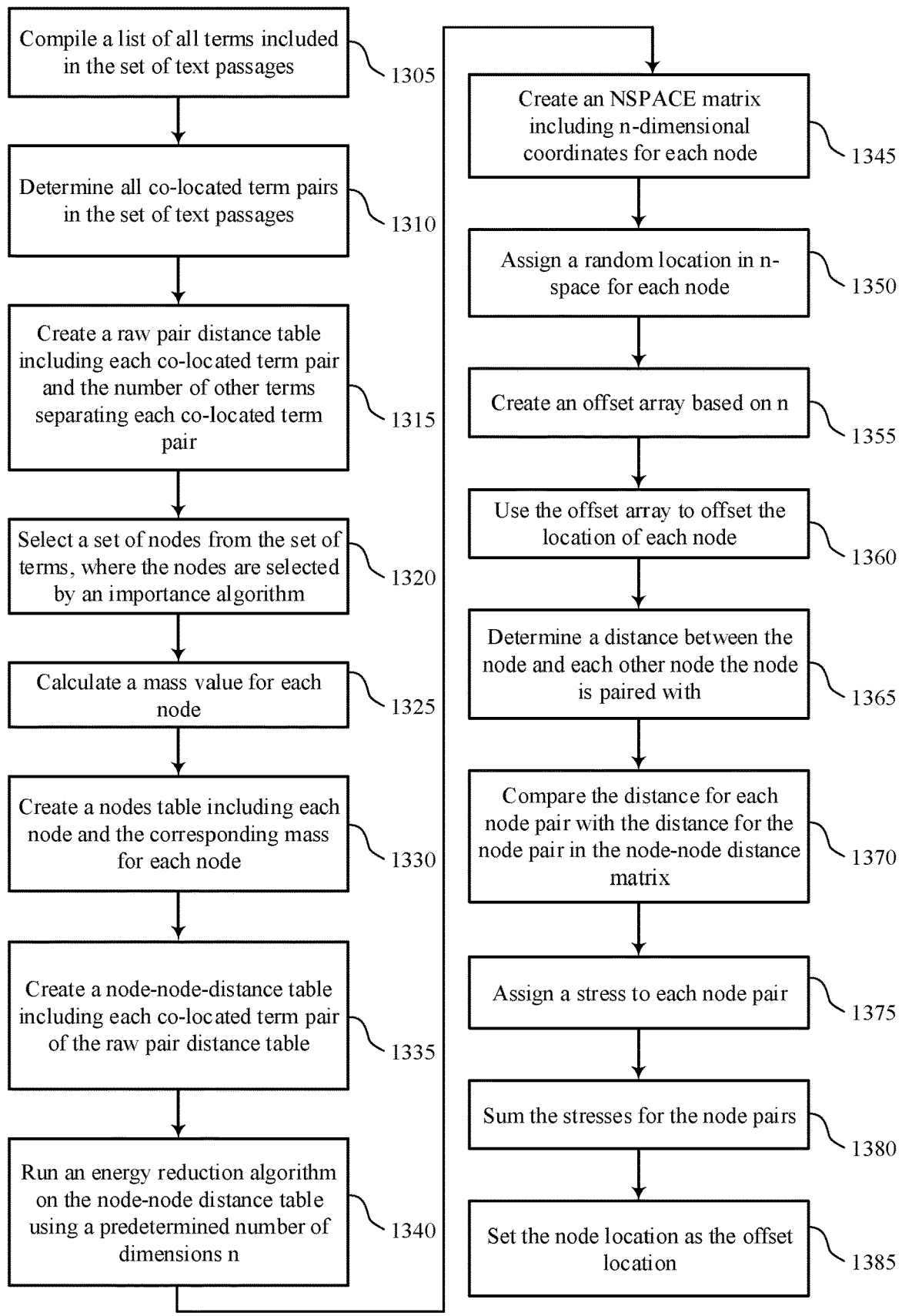

FIG. 13 illustrates an example of a process performed by a text analysis system for data analysis and visualization for enterprise search in accordance with aspects of the present disclosure. In some examples, a text analysis system may execute a set of codes to control functional elements of the text analysis system to perform the described functions. Additionally or alternatively, a text analysis system may use special-purpose hardware. These operations may be performed according to the methods and processes described in accordance with aspects of the present disclosure. For example, the operations may be composed of various sub-steps, or may be performed in conjunction with other operations described herein.

At block 1305 the text analysis system may compile a list of all terms included in the plurality of text passages. In certain examples, aspects of the described operations may be performed by RPD module 115 and 210 as described with reference to FIGS. 1 and 2.

At block 1310 the text analysis system may determine all co-located term pairs in the plurality of text passages, wherein each co-located term pair comprises one occurrence of two different terms separated by no more than a first predetermined number of other terms. In certain examples, aspects of the described operations may be performed by RPD module 115 and 210 as described with reference to FIGS. 1 and 2.

At block 1315 the text analysis system may create a raw pair distance table including each co-located term pair and the number of other terms separating each co-located term pair. In certain examples, aspects of the described operations may be performed by RPD module 115 and 210 as described with reference to FIGS. 1 and 2.

At block 1320 the text analysis system may select a plurality of nodes from the plurality of terms, wherein the nodes are selected by an importance algorithm. In certain examples, aspects of the described operations may be performed by MPD module 120 and 220 as described with reference to FIGS. 1 and 2.

At block 1325 the text analysis system may calculate a mass value for each node. In certain examples, aspects of the described operations may be performed by MPD module 120 and 220 as described with reference to FIGS. 1 and 2.

At block 1330 the text analysis system may create a nodes table including each node and the corresponding mass for each node. In certain examples, aspects of the described operations may be performed by MPD module 120 and 220 as described with reference to FIGS. 1 and 2.

At block 1335 the text analysis system may create a node-node-distance table including each co-located term pair of the raw pair distance table where the co-located term pair includes two nodes, a calculated distance value of the co-located term pair, and a calculated strength value of each pair. In certain examples, aspects of the described operations may be performed by MPD module 120 and 220 as described with reference to FIGS. 1 and 2.

At block 1340 the text analysis system may run an energy reduction algorithm on the node-node distance table using a predetermined number of dimensions n, whereby a point in n-dimensional space is calculated for each node. In certain examples, aspects of the described operations may be performed by ER module 125 and 240 as described with reference to FIGS. 1 and 2.

At block 1345 the text analysis system may create an NSPACE matrix including n-dimensional coordinates for each node. In certain examples, aspects of the described operations may be performed by ER module 125 and 240 as described with reference to FIGS. 1 and 2.

At block 1350 the text analysis system may assign a random location in n-space for each node, where n is a number of dimensions. In certain examples, aspects of the described operations may be performed by ER module 125 and 240 as described with reference to FIGS. 1 and 2.

At block 1355 the text analysis system may create an offset array based on n. In certain examples, aspects of the described operations may be performed by ER module 125 and 240 as described with reference to FIGS. 1 and 2.

At block 1360 the text analysis system may use the offset array to offset the location of each node. In certain examples, aspects of the described operations may be performed by ER module 125 and 240 as described with reference to FIGS. 1 and 2.

At block 1365 the text analysis system may determine a distance between the node and each other node the node is paired with based on the offset location. In certain examples, aspects of the described operations may be performed by ER module 125 and 240 as described with reference to FIGS. 1 and 2.

At block 1370 the text analysis system may compare the distance for each node pair with the distance for the node pair in the node-node distance matrix. In certain examples, aspects of the described operations may be performed by ER module 125 and 240 as described with reference to FIGS. 1 and 2.

At block 1375 the text analysis system may assign a stress to each node pair wherein the larger the distance difference, the greater the stress. In certain examples, aspects of the described operations may be performed by ER module 125 and 240 as described with reference to FIGS. 1 and 2.

At block 1380 the text analysis system may sum the stresses for the node pairs. In certain examples, aspects of the described operations may be performed by ER module 125 and 240 as described with reference to FIGS. 1 and 2.

At block 1385 the text analysis system may set, when the stress is less than a previous stress, the node location as the offset location. In certain examples, aspects of the described operations may be performed by ER module 125 and 240 as described with reference to FIGS. 1 and 2.

Figure 14:
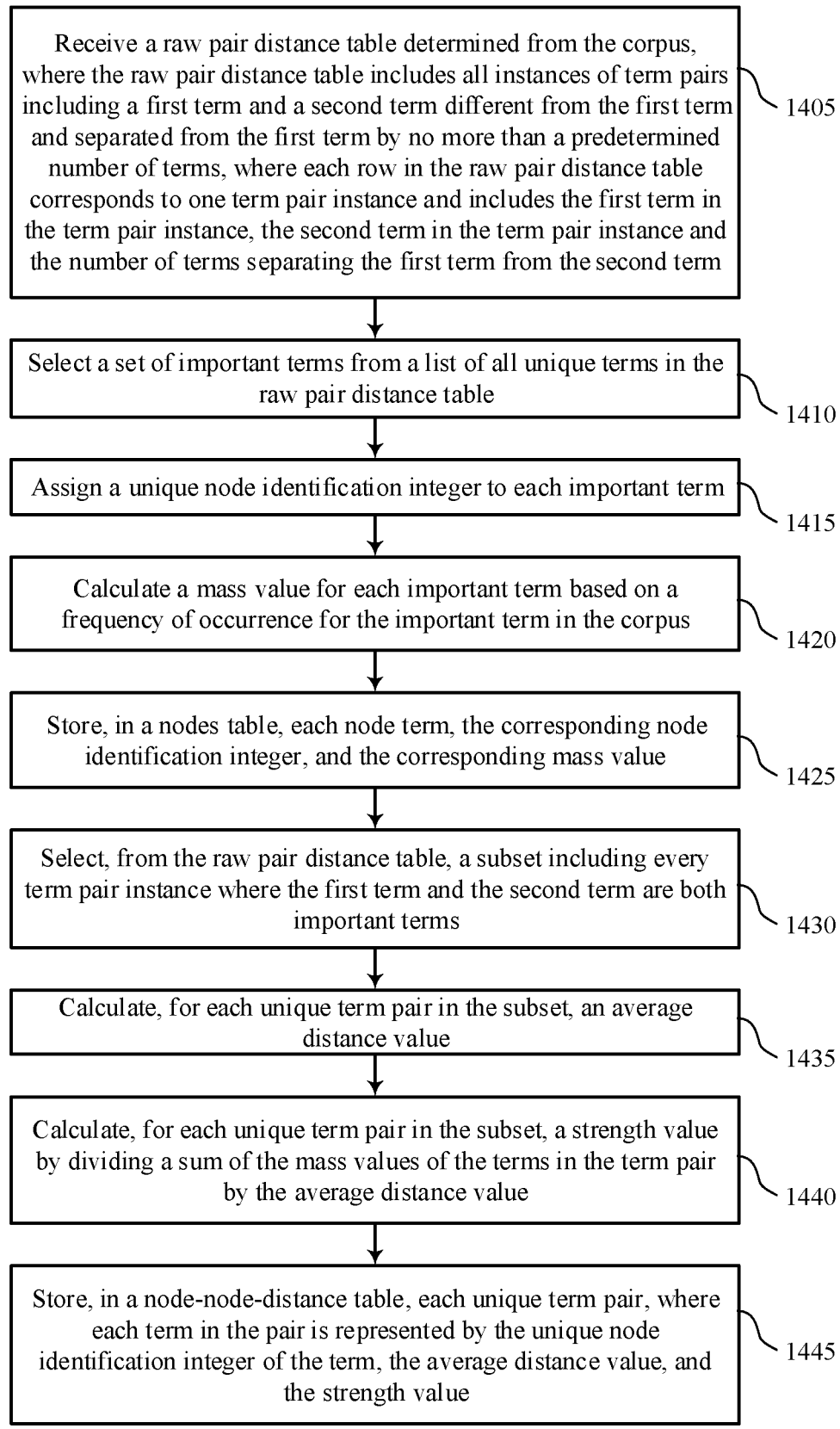

FIG. 14 illustrates an example of a process performed by a text analysis system for data analysis and visualization for enterprise search in accordance with aspects of the present disclosure. In some examples, a text analysis system may execute a set of codes to control functional elements of the text analysis system to perform the described functions. Additionally or alternatively, a text analysis system may use special-purpose hardware. These operations may be performed according to the methods and processes described in accordance with aspects of the present disclosure. For example, the operations may be composed of various sub-steps, or may be performed in conjunction with other operations described herein.

At block 1405 the text analysis system may receive a raw pair distance table determined from the corpus, wherein the raw pair distance table includes all instances of term pairs comprising a first term and a second term different from the first term and separated from the first term by no more than a predetermined number of terms, wherein each row in the raw pair distance table corresponds to one term pair instance and includes the first term in the term pair instance, the second term in the term pair instance and the number of terms separating the first term from the second term. In certain examples, aspects of the described operations may be performed by MPD module 120 and 220 as described with reference to FIGS. 1 and 2.

At block 1410 the text analysis system may select a set of important terms from a list of all unique terms in the raw pair distance table. In certain examples, aspects of the described operations may be performed by MPD module 120 and 220 as described with reference to FIGS. 1 and 2.

At block 1415 the text analysis system may assign a unique node identification integer to each important term. In certain examples, aspects of the described operations may be performed by MPD module 120 and 220 as described with reference to FIGS. 1 and 2.

At block 1420 the text analysis system may calculate a mass value for each important term based on a frequency of occurrence for the important term in the corpus. In certain examples, aspects of the described operations may be performed by MPD module 120 and 220 as described with reference to FIGS. 1 and 2.

At block 1425 the text analysis system may store, in a nodes table, each node term, the corresponding node identification integer, and the corresponding mass value. In certain examples, aspects of the described operations may be performed by MPD module 120 and 220 as described with reference to FIGS. 1 and 2.

At block 1430 the text analysis system may select, from the raw pair distance table, a subset comprising every term pair instance wherein the first term and the second term are both important terms. In certain examples, aspects of the described operations may be performed by MPD module 120 and 220 as described with reference to FIGS. 1 and 2.

At block 1435 the text analysis system may calculate, for each unique term pair in the subset, an average distance value. In certain examples, aspects of the described operations may be performed by MPD module 120 and 220 as described with reference to FIGS. 1 and 2.

At block 1440 the text analysis system may calculate, for each unique term pair in the subset, a strength value by dividing a sum of the mass values of the terms in the term pair by the average distance value. In certain examples, aspects of the described operations may be performed by MPD module 120 and 220 as described with reference to FIGS. 1 and 2.

At block 1445 the text analysis system may store, in a node-node-distance table, each unique term pair, wherein each term in the pair is represented by the unique node identification integer of the term, the average distance value, and the strength value. In certain examples, aspects of the described operations may be performed by MPD module 120 and 220 as described with reference to FIGS. 1 and 2.

Figure 15:
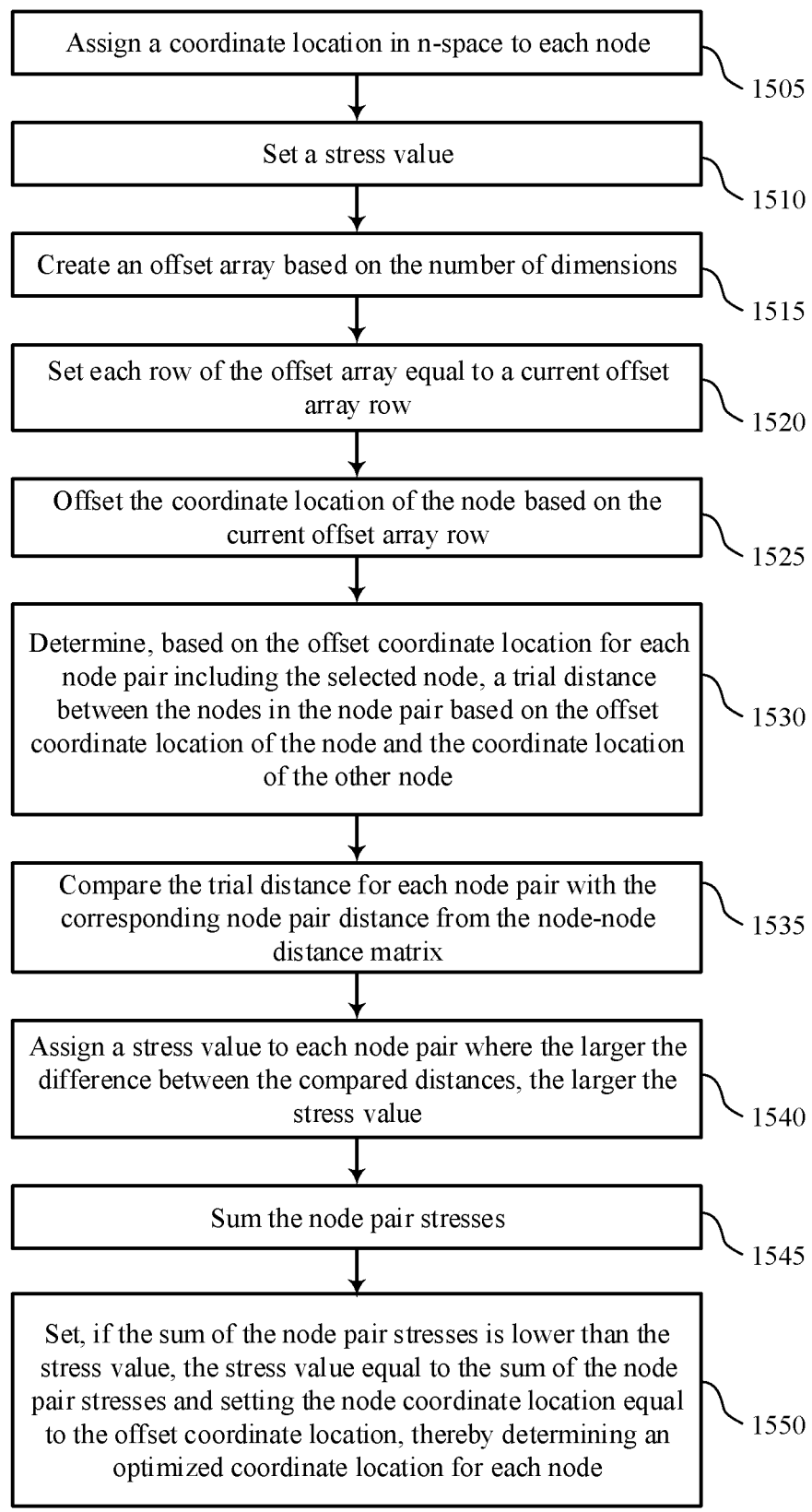

FIG. 15 illustrates an example of a process performed by a text analysis system for data analysis and visualization for enterprise search in accordance with aspects of the present disclosure. In some examples, a text analysis system may execute a set of codes to control functional elements of the text analysis system to perform the described functions. Additionally or alternatively, a text analysis system may use special-purpose hardware. These operations may be performed according to the methods and processes described in accordance with aspects of the present disclosure. For example, the operations may be composed of various substeps, or may be performed in conjunction with other operations described herein.

At block 1505 the text analysis system may assign a coordinate location in n-space to each node. In certain examples, aspects of the described operations may be performed by ER module 125 and 240 as described with reference to FIGS. 1 and 2.

At block 1510 the text analysis system may set a stress value. In certain examples, aspects of the described operations may be performed by ER module 125 and 240 as described with reference to FIGS. 1 and 2.

At block 1515 the text analysis system may create an offset array based on the number of dimensions. In certain examples, aspects of the described operations may be performed by ER module 125 and 240 as described with reference to FIGS. 1 and 2.

At block 1520 the text analysis system may set each row of the offset array equal to a current offset array row. In certain examples, aspects of the described operations may be performed by ER module 125 and 240 as described with reference to FIGS. 1 and 2.

At block 1525 the text analysis system may offset the coordinate location of the node based on the current offset array row. In certain examples, aspects of the described operations may be performed by ER module 125 and 240 as described with reference to FIGS. 1 and 2.

At block 1530 the text analysis system may determine, based on the offset coordinate location for each node pair including the selected node, a trial distance between the nodes in the node pair based on the offset coordinate location of the node and the coordinate location of the other node. In certain examples, aspects of the described operations may be performed by ER module 125 and 240 as described with reference to FIGS. 1 and 2.

At block 1535 the text analysis system may compare the trial distance for each node pair with the corresponding node pair distance from the node-node distance matrix. In certain examples, aspects of the described operations may be performed by ER module 125 and 240 as described with reference to FIGS. 1 and 2.

At block 1540 the text analysis system may assign a stress value to each node pair wherein the larger the difference between the compared distances, the larger the stress value. In certain examples, aspects of the described operations may be performed by ER module 125 and 240 as described with reference to FIGS. 1 and 2.

At block 1545 the text analysis system may sum the node pair stresses. In certain examples, aspects of the described operations may be performed by ER module 125 and 240 as described with reference to FIGS. 1 and 2.

At block 1550 the text analysis system may set, if the sum of the node pair stresses is lower than the stress value, the stress value equal to the sum of the node pair stresses and setting the node coordinate location equal to the offset coordinate location, thereby determining an optimized coordinate location for each node. In certain examples, aspects of the described operations may be performed by ER module 125 and 240 as described with reference to FIGS. 1 and 2.

Some of the functional units described in this specification have been labeled as modules, or components, to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While the invention herein disclosed has been described by means of specific embodiments, examples and applications thereof, numerous modifications and variations could be made thereto by those skilled in the art without departing from the scope of the invention set forth in the claims.

What is claimed is:

1. A text analysis system, comprising:
   a central processing unit (CPU); and
   a Mean Pair Distance (MPD) module operatively coupled to the CPU and configured to:
   receive a raw pair distance table derived from a corpus of text comprising a plurality of text passages, wherein the raw pair distance table lists each instance of each term pair occurring in the corpus, wherein each term pair comprises a first term and a second term, wherein an instance of the term pair occurs when the first term and the second term are located in the same passage and with the second term occurring after the first term, with the first term and the second term are separated in the passage by no more than a predetermined number of intervening terms, wherein for each term pair instance the raw pair table includes the first term in the pair, the second term in the pair, and the number of intervening terms, wherein the number of intervening terms is a distance value for the term pair instance;
   designate a plurality of terms in the corpus of text as important;
   calculate a mass value for each important term based on the frequency of occurrence of that term in the corpus;
   select a subset of the raw pair distance table comprising all term pair instances where both terms in the term pair instance are important terms;
   for each unique term pair in the subset, calculate an average distance value based on the term pair distance values in the subset; and
   calculate a strength for each unique term pair in the subset, where the strength is based on the mass value of each term in the term pair and the average distance value of the unique term pair.

2. The text analysis system of claim 1, the MPD module further configured to assign a numerical ID to each important term.

3. The text analysis system of claim 2, the MPD further configured to create a nodes table, wherein for each important term the nodes table includes the numerical ID of the important term and the mass value of the important term.

4. The text analysis system of claim 1, wherein the mass value for each important term is the number of occurrences of the important term in the raw pair distance table.

5. The text analysis system of claim 1, wherein the average distance value for each term pair in the subset is the sum of the distance values for each instance of that term pair in the subset, divided by the number of instances of that term pair in the subset.

6. The text analysis system of claim 1, wherein the strength is the sum of the mass value for each term in the term pair, divided by the average distance value of the term pair.

7. The text analysis system of claim 1, wherein the MPD module is further configured to create a node-node distance matrix identifying each unique term pair in the subset, the average distance value for the term pair, and the average distance value for the term pair.

8. The text analysis system of claim 7, wherein the MPD module is further configured to assign a numerical ID to each important term, and wherein each unique term is identified in the node-node distance matrix by the numerical ID for the unique term.

9. The text analysis system of claim 1, wherein the designation of terms as important is performed using an importance algorithm.

10. The text analysis system of claim 9, wherein the importance algorithm includes calculating an observed-versus-expected ratio for each term in the corpus by dividing a frequency of each term by a predetermined expected average frequency for that term.

11. A method for text analysis, comprising the steps of:
    receiving, by a Mean Pair Distance Module (MPD) operatively coupled to a central processing unit (CPU), a raw pair distance table derived from a corpus of text comprising a plurality of text passages, wherein the raw pair distance table lists each instance of each term pair occurring in the corpus, wherein each term pair comprises a first term and a second term, wherein an instance of the term pair occurs when the first term and the second term are located in the same passage and with the second term occurring after the first term, with the first term and the second term are separated in the passage by no more than a predetermined number of intervening terms, wherein for each term pair instance the raw pair table includes the first term in the pair, the second term in the pair, and the number of intervening terms, wherein the number of intervening terms is a distance value for the term pair instance;
    designating, by the MPD, of a plurality of terms in the corpus of text as important;
    calculating, by the MPD, of a mass value for each important term based on the frequency of occurrence of that term in the corpus;
    selecting, by the MPD, of a subset of the raw pair distance table comprising all term pair instances where both terms in the term pair instance are important terms;
    for each unique term pair in the subset, calculating by the MPD of an average distance value based on the term pair distance values in the subset; and
    calculating, by the MPD, of a strength for each unique term pair in the subset, where the strength is based on the mass value of each term in the term pair and the average distance value of the unique term pair.

12. The method for text analysis of claim 11, further comprising the step of assigning, by the MPD module, of a numerical ID to each important term.

13. The method for text analysis of claim 12, further comprising the step of creating, by the MPD module, of a nodes table, wherein for each important term the nodes table includes the numerical ID of the important term and the mass value of the important term.

14. The method for text analysis of claim 11, wherein the mass value for each important term is the number of occurrences of the important term in the raw pair distance table.

15. The method for text analysis of claim 11, wherein the average distance value for each term pair in the subset is the sum of the distance values for each instance of that term pair in the subset, divided by the number of instances of that term pair in the subset.

16. The method for text analysis of claim 11, wherein the strength is the sum of the mass value for each term in the term pair, divided by the average distance value of the term pair.

17. The method for text analysis of claim 11, further comprising the step of creating, by the MPD module, of a node-node distance matrix identifying each unique term pair in the subset, the average distance value for the term pair, and the average distance value for the term pair.

18. The method for text analysis of claim 17, further comprising the step of assigning, by the MPD module, of a numerical ID to each important term, and wherein each unique term is identified in the node-node distance matrix by the numerical ID for the unique term.

19. The method for text analysis of claim 11, wherein the designation of terms as important is performed using an importance algorithm.

20. The method for text analysis of claim 19, wherein the importance algorithm includes calculating an observed-versus-expected ratio for each term in the corpus by dividing a frequency of each term by a predetermined expected average frequency for that term.

\* \* \* \* \*